United States Patent
Gould et al.

(10) Patent No.: US 11,669,595 B2
(45) Date of Patent: Jun. 6, 2023

(54) METHODS AND APPARATUS FOR SECONDARY CONTENT MANAGEMENT AND FRAUD PREVENTION

(71) Applicant: Time Warner Cable Enterprises LLC, St. Louis, MO (US)

(72) Inventors: Kenneth Gould, Reston, VA (US); Vipul Patel, Upper Holland, PA (US)

(73) Assignee: TIME WARNER CABLE ENTERPRISES LLC, St. Louis, MO (US)

(*) Notice: Subject to any disclaimer, the term of this patent is extended or adjusted under 35 U.S.C. 154(b) by 201 days.

(21) Appl. No.: 16/813,471

(22) Filed: Mar. 9, 2020

(65) Prior Publication Data
US 2020/0279027 A1  Sep. 3, 2020

Related U.S. Application Data

(63) Continuation of application No. 15/135,186, filed on Apr. 21, 2016, now Pat. No. 10,586,023.

(51) Int. Cl.
| | |
|---|---|
| *G06Q 30/00* | (2023.01) |
| *G06F 21/10* | (2013.01) |
| *H04L 9/40* | (2022.01) |
| *G06Q 30/0241* | (2023.01) |

(52) U.S. Cl.
CPC .......... *G06F 21/10* (2013.01); *G06Q 30/0248* (2013.01); *H04L 63/08* (2013.01)

(58) Field of Classification Search
None
See application file for complete search history.

(56) References Cited

U.S. PATENT DOCUMENTS

| | | | |
|---|---|---|---|
| 4,521,881 A | 6/1985 | Stapleford et al. | |
| 4,546,382 A | 10/1985 | McKenna et al. | |
| 4,602,279 A | 7/1986 | Freeman | |
| 4,905,080 A | 2/1990 | Watanabe et al. | |

(Continued)

FOREIGN PATENT DOCUMENTS

| | | |
|---|---|---|
| WO | WO-9935846 A1 | 7/1999 |
| WO | WO-0191474 A2 | 11/2001 |

OTHER PUBLICATIONS

Liu, Qiong, et al. "Digital Rights Management for Content Distribution." 2nd Australian Institute of Computer Ethics Conference—AICE 2000, Canberra. (Year: 2001).*

(Continued)

*Primary Examiner* — Luis A Brown
(74) *Attorney, Agent, or Firm* — Patent Beach PC

(57) ABSTRACT

Methods and apparatus for secondary content management, including preventing viewing fraud, are disclosed. In one embodiment, apparatus of the present disclosure includes an Advertisement Decisioning Service (ADS) and Manifest Manipulator (MM) configured cooperate to receive client requests for secondary content, select one or more secondary content elements (e.g., advertisements), and generate and transmit one or more identifiers that uniquely identify the client's request for a session. The selected advertisements in one implementation include embedded beacons or tags used to ensure accurate accounting with regards to the amount or quality of consumption of the advertisement by a user.

20 Claims, 14 Drawing Sheets

(56) References Cited

U.S. PATENT DOCUMENTS

| | | |
|---|---|---|
| 4,930,120 A | 5/1990 | Baxter et al. |
| 5,155,591 A | 10/1992 | Wachob |
| 5,313,454 A | 5/1994 | Bustini et al. |
| 5,373,315 A | 12/1994 | Dufresne et al. |
| 5,481,294 A | 1/1996 | Thomas et al. |
| 5,497,185 A | 3/1996 | Dufresne et al. |
| 5,515,510 A | 5/1996 | Kikinis |
| 5,600,364 A | 2/1997 | Hendricks et al. |
| 5,675,647 A | 10/1997 | Garneau et al. |
| 5,734,720 A | 3/1998 | Salganicoff |
| 5,758,257 A | 5/1998 | Herz et al. |
| 5,774,170 A | 6/1998 | Hite et al. |
| 5,790,935 A | 8/1998 | Payton |
| 5,793,409 A | 8/1998 | Tetsumura |
| 5,812,642 A | 9/1998 | Leroy |
| 5,815,146 A | 9/1998 | Youden et al. |
| 5,862,312 A | 1/1999 | Mann et al. |
| 5,878,324 A | 3/1999 | Borth et al. |
| 5,914,945 A | 6/1999 | Abu-Amara et al. |
| 5,926,205 A | 7/1999 | Krause et al. |
| 5,929,849 A | 7/1999 | Kikinis |
| 5,935,206 A | 8/1999 | Dixon et al. |
| 5,956,037 A | 9/1999 | Osawa et al. |
| 5,963,844 A | 10/1999 | Dail |
| 5,974,299 A | 10/1999 | Massetti |
| 5,987,506 A | 11/1999 | Carter et al. |
| 6,002,393 A | 12/1999 | Hite et al. |
| 6,006,265 A | 12/1999 | Rangan et al. |
| 6,029,045 A | 2/2000 | Picco et al. |
| 6,047,327 A | 4/2000 | Tso et al. |
| 6,081,830 A | 6/2000 | Schindler |
| 6,088,722 A | 7/2000 | Herz et al. |
| 6,092,178 A | 7/2000 | Jindal et al. |
| 6,092,197 A | 7/2000 | Coueignoux |
| 6,122,647 A | 9/2000 | Horowitz et al. |
| 6,124,878 A | 9/2000 | Adams et al. |
| 6,128,316 A | 10/2000 | Takeda et al. |
| 6,134,532 A | 10/2000 | Lazarus et al. |
| 6,161,142 A | 12/2000 | Wolfe et al. |
| 6,169,728 B1 | 1/2001 | Perreault et al. |
| 6,177,931 B1 | 1/2001 | Alexander et al. |
| 6,182,050 B1 | 1/2001 | Ballard |
| 6,202,210 B1 | 3/2001 | Ludtke |
| 6,211,901 B1 | 4/2001 | Imajima et al. |
| 6,216,129 B1 | 4/2001 | Eldering |
| 6,219,840 B1 | 4/2001 | Corrigan et al. |
| 6,240,553 B1 | 5/2001 | Son et al. |
| 6,249,680 B1 | 6/2001 | Wax et al. |
| 6,272,176 B1 | 8/2001 | Srinivasan |
| 6,282,713 B1 | 8/2001 | Kitsukawa et al. |
| 6,286,041 B1 | 9/2001 | Collins, III et al. |
| 6,330,609 B1 | 12/2001 | Garofalakis et al. |
| 6,353,626 B1 | 3/2002 | Sunay et al. |
| 6,378,130 B1 | 4/2002 | Adams |
| 6,385,454 B1 | 5/2002 | Bahl et al. |
| 6,389,538 B1 | 5/2002 | Gruse et al. |
| 6,396,055 B1 | 5/2002 | Biedendorf |
| 6,434,141 B1 | 8/2002 | Oz et al. |
| 6,446,261 B1 | 9/2002 | Rosser |
| 6,463,585 B1 | 10/2002 | Hendricks et al. |
| 6,467,089 B1 | 10/2002 | Aust et al. |
| 6,498,783 B1 | 12/2002 | Lin |
| 6,502,076 B1 | 12/2002 | Smith |
| 6,549,718 B1 | 4/2003 | Grooters et al. |
| 6,560,578 B2 | 5/2003 | Eldering |
| 6,590,865 B1 | 7/2003 | Ibaraki et al. |
| 6,601,237 B1 | 7/2003 | Ten et al. |
| 6,604,138 B1 | 8/2003 | Virine et al. |
| 6,615,039 B1 | 9/2003 | Eldering |
| 6,615,251 B1 | 9/2003 | Klug et al. |
| 6,647,548 B1 | 11/2003 | Lu et al. |
| 6,671,736 B2 | 12/2003 | Virine et al. |
| 6,681,393 B1 | 1/2004 | Bauminger et al. |
| 6,687,735 B1 | 2/2004 | Logston et al. |
| 6,700,624 B2 | 3/2004 | Yun |
| 6,704,930 B1 | 3/2004 | Eldering et al. |
| 6,711,148 B1 | 3/2004 | Hills |
| 6,718,551 B1 | 4/2004 | Swix et al. |
| 6,725,461 B1 | 4/2004 | Dougherty et al. |
| 6,738,978 B1 | 5/2004 | Hendricks et al. |
| 6,742,187 B1 | 5/2004 | Vogel |
| 6,763,391 B1 | 7/2004 | Ludtke |
| 6,771,290 B1 | 8/2004 | Hoyle |
| 6,775,843 B1 | 8/2004 | McDermott |
| 6,785,704 B1 | 8/2004 | McCanne |
| 6,813,776 B2 | 11/2004 | Chernock et al. |
| 6,842,783 B1 | 1/2005 | Boivie et al. |
| 6,859,845 B2 | 2/2005 | Mate |
| 6,891,841 B2 | 5/2005 | Leatherbury et al. |
| 6,898,762 B2 | 5/2005 | Ellis et al. |
| 6,901,606 B2 | 5/2005 | Wright et al. |
| 6,909,837 B1 | 6/2005 | Unger |
| 6,915,528 B1 | 7/2005 | McKenna, Jr. |
| 6,975,850 B1 | 12/2005 | Hurtta et al. |
| 6,986,156 B1 | 1/2006 | Rodriguez et al. |
| 6,990,680 B1 | 1/2006 | Wugofski |
| 7,007,170 B2 | 2/2006 | Morten |
| 7,017,179 B1 | 3/2006 | Asamoto et al. |
| 7,024,466 B2 | 4/2006 | Outten et al. |
| 7,024,676 B1 | 4/2006 | Klopfenstein |
| 7,028,071 B1 | 4/2006 | Slik |
| 7,039,928 B2 | 5/2006 | Kamada et al. |
| 7,065,216 B1 | 6/2006 | Benaloh et al. |
| 7,069,573 B1 | 6/2006 | Brooks et al. |
| 7,075,945 B2 | 7/2006 | Arsenault et al. |
| 7,086,077 B2 | 8/2006 | Giammaressi |
| 7,100,183 B2 | 8/2006 | Kunkel et al. |
| 7,109,848 B2 | 9/2006 | Schybergson |
| 7,143,431 B1 | 11/2006 | Eager et al. |
| 7,146,627 B1 | 12/2006 | Ismail et al. |
| 7,152,237 B2 | 12/2006 | Flickinger et al. |
| 7,155,508 B2 | 12/2006 | Sankuratripati et al. |
| 7,159,235 B2 | 1/2007 | Son et al. |
| 7,165,268 B1 | 1/2007 | Moore et al. |
| 7,174,126 B2 | 2/2007 | McElhatten et al. |
| 7,191,461 B1 | 3/2007 | Arsenault et al. |
| 7,197,472 B2 | 3/2007 | Conkwright et al. |
| 7,213,036 B2 | 5/2007 | Apparao et al. |
| 7,222,078 B2 | 5/2007 | Abelow |
| 7,222,163 B1 | 5/2007 | Girouard et al. |
| 7,228,359 B1 | 6/2007 | Monteiro |
| 7,228,555 B2 | 6/2007 | Schlack |
| 7,237,017 B1 | 6/2007 | Pecus et al. |
| 7,237,250 B2 | 6/2007 | Kanojia et al. |
| 7,240,355 B1 | 7/2007 | Eldering et al. |
| 7,242,988 B1 | 7/2007 | Hoffberg et al. |
| 7,246,150 B1 | 7/2007 | Donoho et al. |
| 7,246,172 B2 | 7/2007 | Yoshiba et al. |
| 7,248,694 B2 | 7/2007 | Husemann et al. |
| 7,260,564 B1 | 8/2007 | Lynn et al. |
| 7,266,836 B2 | 9/2007 | Anttila et al. |
| 7,280,737 B2 | 10/2007 | Smith |
| 7,281,261 B2 | 10/2007 | Jaff et al. |
| 7,308,415 B2 | 12/2007 | Kimbrel et al. |
| 7,317,728 B2 | 1/2008 | Acharya et al. |
| 7,327,692 B2 | 2/2008 | Ain et al. |
| 7,330,875 B1 | 2/2008 | Parasnis et al. |
| 7,334,044 B1 | 2/2008 | Allen |
| 7,340,510 B1 | 3/2008 | Liskov et al. |
| 7,340,759 B1 | 3/2008 | Rodriguez |
| 7,346,630 B2 | 3/2008 | Eichstaedt et al. |
| 7,346,688 B2 | 3/2008 | Allen et al. |
| 7,352,775 B2 | 4/2008 | Powell |
| 7,353,543 B2 | 4/2008 | Ohmori et al. |
| 7,355,980 B2 | 4/2008 | Bauer et al. |
| 7,356,751 B1 | 4/2008 | Levitan |
| 7,357,775 B1 | 4/2008 | Koh |
| 7,363,371 B2 | 4/2008 | Kirby et al. |
| 7,363,643 B2 | 4/2008 | Drake et al. |
| 7,367,043 B2 | 4/2008 | Dudkiewicz et al. |
| 7,369,750 B2 | 5/2008 | Cheng et al. |
| 7,379,494 B2 | 5/2008 | Raleigh et al. |
| 7,441,037 B2 | 10/2008 | Saxena |
| 7,444,655 B2 | 10/2008 | Sardera |

(56) References Cited

U.S. PATENT DOCUMENTS

| | | | |
|---|---|---|---|
| 7,457,520 B2 | 11/2008 | Rosetti et al. |
| 7,464,179 B2 | 12/2008 | Hodges et al. |
| 7,487,363 B2 | 2/2009 | Alve et al. |
| 7,558,837 B1 | 7/2009 | Denny |
| 7,567,565 B2 | 7/2009 | La |
| 7,567,983 B2 | 7/2009 | Pickelsimer et al. |
| 7,577,118 B2 | 8/2009 | Haumonte et al. |
| 7,602,820 B2 | 10/2009 | Helms et al. |
| 7,603,321 B2 | 10/2009 | Gurvey |
| 7,603,529 B1 | 10/2009 | Machardy et al. |
| 7,636,792 B1 | 12/2009 | Ho |
| 7,650,319 B2 | 1/2010 | Hoffberg et al. |
| 7,653,689 B1 | 1/2010 | Champagne et al. |
| 7,711,605 B1 | 5/2010 | Santeufemia et al. |
| 7,712,125 B2 | 5/2010 | Herigstad et al. |
| 7,720,432 B1 | 5/2010 | Colby et al. |
| 7,729,940 B2 | 6/2010 | Harvey et al. |
| 7,730,509 B2 | 6/2010 | Boulet et al. |
| 7,783,316 B1 | 8/2010 | Mitchell |
| 7,788,687 B1 | 8/2010 | Conrad et al. |
| 7,801,803 B2 | 9/2010 | Forlai |
| 7,870,599 B2 | 1/2011 | Pemmaraju |
| 7,900,052 B2 | 3/2011 | Jonas et al. |
| 7,900,229 B2 | 3/2011 | Dureau |
| 7,930,558 B2 | 4/2011 | Hori |
| 7,930,715 B2 | 4/2011 | Hendricks et al. |
| 7,954,131 B2 | 5/2011 | Cholas et al. |
| 7,986,686 B2 | 7/2011 | Nadeau et al. |
| 8,010,691 B2 * | 8/2011 | Kollmansberger ... H04L 65/765 |
| | | | 709/246 |
| 8,028,322 B2 | 9/2011 | Riedl et al. |
| 8,041,785 B2 | 10/2011 | Mazur et al. |
| 8,042,131 B2 | 10/2011 | Flickinger |
| 8,065,703 B2 | 11/2011 | Wilson et al. |
| 8,073,460 B1 | 12/2011 | Scofield et al. |
| 8,084,792 B2 | 12/2011 | Lehmann et al. |
| 8,099,757 B2 | 1/2012 | Riedl et al. |
| 8,151,295 B1 | 4/2012 | Eldering et al. |
| 8,205,226 B2 | 6/2012 | Ko et al. |
| 8,214,256 B2 | 7/2012 | Riedl et al. |
| 8,228,818 B2 * | 7/2012 | Chase .................... H04L 41/06 |
| | | | 370/232 |
| 8,249,918 B1 | 8/2012 | Biere et al. |
| 8,272,020 B2 | 9/2012 | Watson et al. |
| 8,296,185 B2 | 10/2012 | Isaac |
| 8,306,634 B2 | 11/2012 | Nguyen et al. |
| 8,341,242 B2 | 12/2012 | Dillon et al. |
| 8,347,341 B2 | 1/2013 | Markley et al. |
| 8,365,213 B1 | 1/2013 | Orlowski |
| 8,396,055 B2 | 3/2013 | Patel et al. |
| 8,396,056 B2 | 3/2013 | Dalton, Jr. et al. |
| 8,442,265 B1 | 5/2013 | Bosworth et al. |
| 8,484,511 B2 * | 7/2013 | Tidwell ............... H04N 21/6582 |
| | | | 709/224 |
| 8,516,529 B2 | 8/2013 | Lajoie et al. |
| 8,561,113 B2 | 10/2013 | Cansler et al. |
| 8,571,931 B2 | 10/2013 | Riedl et al. |
| 8,583,484 B1 | 11/2013 | Chalawsky et al. |
| 8,621,501 B2 | 12/2013 | Matheny et al. |
| 8,713,623 B2 | 4/2014 | Brooks |
| 8,769,559 B2 | 7/2014 | Moon et al. |
| 8,848,969 B2 | 9/2014 | Ramsdell et al. |
| 8,856,825 B1 * | 10/2014 | Mick, Jr. ............ H04N 21/2353 |
| | | | 725/32 |
| 8,862,155 B2 | 10/2014 | Stern et al. |
| 8,863,164 B1 * | 10/2014 | Mick, Jr. ........... H04N 21/44204 |
| | | | 725/32 |
| 8,866,911 B1 | 10/2014 | Sivertsen |
| 8,898,270 B1 | 11/2014 | Stack et al. |
| 8,997,136 B2 | 3/2015 | Brooks et al. |
| 9,003,436 B2 * | 4/2015 | Tidwell ............... H04N 21/4667 |
| | | | 709/224 |
| 9,027,062 B2 | 5/2015 | Patel et al. |
| 9,071,859 B2 | 6/2015 | Lajoie |
| 9,215,423 B2 | 12/2015 | Kimble et al. |
| 9,286,388 B2 | 3/2016 | Marsh et al. |
| 9,313,530 B2 * | 4/2016 | Helms ............... H04N 21/23473 |
| 9,479,807 B1 * | 10/2016 | Bugajski ............ H04N 21/6582 |
| 10,028,025 B2 * | 7/2018 | Tidwell ............ H04N 21/64322 |
| 10,032,190 B2 | 7/2018 | Marsh et al. |
| 10,051,305 B2 * | 8/2018 | Tidwell ............ H04N 21/26283 |
| 10,212,049 B2 * | 2/2019 | Hardin ................ H04L 41/5019 |
| 10,313,755 B2 | 6/2019 | Kimble et al. |
| 10,445,784 B2 | 10/2019 | Marsh et al. |
| 10,506,296 B2 | 12/2019 | Bonvolanta et al. |
| 10,721,504 B2 | 7/2020 | Stern et al. |
| 11,403,849 B2 | 8/2022 | Weerasinghe et al. |
| 2001/0001160 A1 | 5/2001 | Shoff et al. |
| 2001/0013123 A1 | 8/2001 | Freeman et al. |
| 2001/0030785 A1 | 10/2001 | Pangrac et al. |
| 2001/0056573 A1 | 12/2001 | Kovac et al. |
| 2002/0013772 A1 | 1/2002 | Peinado |
| 2002/0026496 A1 | 2/2002 | Boyer et al. |
| 2002/0032754 A1 | 3/2002 | Logston et al. |
| 2002/0038296 A1 | 3/2002 | Margolus et al. |
| 2002/0049902 A1 | 4/2002 | Rhodes |
| 2002/0054589 A1 | 5/2002 | Ethridge et al. |
| 2002/0055924 A1 | 5/2002 | Liming |
| 2002/0056107 A1 | 5/2002 | Schlack |
| 2002/0059577 A1 | 5/2002 | Lu et al. |
| 2002/0059619 A1 | 5/2002 | Lebar |
| 2002/0063621 A1 | 5/2002 | Tseng et al. |
| 2002/0069404 A1 | 6/2002 | Copeman et al. |
| 2002/0073419 A1 | 6/2002 | Yen et al. |
| 2002/0073421 A1 | 6/2002 | Levitan et al. |
| 2002/0075805 A1 | 6/2002 | Gupta et al. |
| 2002/0078441 A1 | 6/2002 | Drake et al. |
| 2002/0078444 A1 | 6/2002 | Krewin et al. |
| 2002/0082858 A1 | 6/2002 | Heddaya et al. |
| 2002/0087975 A1 | 7/2002 | Schlack |
| 2002/0087976 A1 | 7/2002 | Kaplan et al. |
| 2002/0095684 A1 | 7/2002 | St. John et al. |
| 2002/0100063 A1 | 7/2002 | Herigstad et al. |
| 2002/0104083 A1 | 8/2002 | Hendricks et al. |
| 2002/0112240 A1 | 8/2002 | Bacso et al. |
| 2002/0120498 A1 | 8/2002 | Gordon et al. |
| 2002/0123928 A1 | 9/2002 | Eldering et al. |
| 2002/0124182 A1 | 9/2002 | Bacso et al. |
| 2002/0129368 A1 | 9/2002 | Schlack et al. |
| 2002/0129378 A1 | 9/2002 | Cloonan et al. |
| 2002/0144263 A1 | 10/2002 | Eldering et al. |
| 2002/0147984 A1 | 10/2002 | Tomsen et al. |
| 2002/0152393 A1 | 10/2002 | Thoma et al. |
| 2002/0154655 A1 | 10/2002 | Gummalla et al. |
| 2002/0161835 A1 | 10/2002 | Ball et al. |
| 2002/0163928 A1 | 11/2002 | Rudnick et al. |
| 2002/0166119 A1 | 11/2002 | Cristofalo |
| 2002/0174430 A1 | 11/2002 | Ellis et al. |
| 2002/0178445 A1 | 11/2002 | Eldering et al. |
| 2002/0178447 A1 | 11/2002 | Plotnick et al. |
| 2002/0184091 A1 | 12/2002 | Pudar |
| 2002/0184629 A1 | 12/2002 | Sie et al. |
| 2002/0184634 A1 | 12/2002 | Cooper |
| 2002/0184635 A1 | 12/2002 | Istvan |
| 2003/0002862 A1 | 1/2003 | Rodriguez et al. |
| 2003/0004810 A1 | 1/2003 | Eldering |
| 2003/0005446 A1 | 1/2003 | Jaff et al. |
| 2003/0005453 A1 | 1/2003 | Rodriguez et al. |
| 2003/0007516 A1 | 1/2003 | Abramov et al. |
| 2003/0018977 A1 | 1/2003 | McKenna |
| 2003/0020744 A1 | 1/2003 | Ellis et al. |
| 2003/0030751 A1 | 2/2003 | Lupulescu et al. |
| 2003/0033199 A1 | 2/2003 | Coleman |
| 2003/0046704 A1 | 3/2003 | Laksono et al. |
| 2003/0056217 A1 | 3/2003 | Brooks |
| 2003/0061619 A1 | 3/2003 | Giammaressi |
| 2003/0071117 A1 | 4/2003 | Meade |
| 2003/0077067 A1 | 4/2003 | Wu et al. |
| 2003/0093311 A1 | 5/2003 | Knowlson |
| 2003/0093784 A1 | 5/2003 | Dimitrova et al. |
| 2003/0093790 A1 | 5/2003 | Logan et al. |
| 2003/0093792 A1 | 5/2003 | Labeeb et al. |
| 2003/0101449 A1 | 5/2003 | Bentolila et al. |

(56) References Cited

U.S. PATENT DOCUMENTS

| | | |
|---|---|---|
| 2003/0101451 A1 | 5/2003 | Bentolila et al. |
| 2003/0101454 A1 | 5/2003 | Ozer et al. |
| 2003/0110499 A1 | 6/2003 | Knudson et al. |
| 2003/0110503 A1 | 6/2003 | Perkes |
| 2003/0114162 A1 | 6/2003 | Chheda et al. |
| 2003/0115601 A1 | 6/2003 | Palazzo et al. |
| 2003/0115612 A1 | 6/2003 | Mao et al. |
| 2003/0135513 A1 | 7/2003 | Quinn et al. |
| 2003/0139980 A1 | 7/2003 | Hamilton |
| 2003/0140351 A1 | 7/2003 | Hoarty et al. |
| 2003/0145323 A1 | 7/2003 | Hendricks et al. |
| 2003/0149581 A1 | 8/2003 | Chaudhri et al. |
| 2003/0149884 A1 | 8/2003 | Hernandez et al. |
| 2003/0149975 A1 | 8/2003 | Eldering et al. |
| 2003/0149990 A1 | 8/2003 | Anttila et al. |
| 2003/0149993 A1 | 8/2003 | Son et al. |
| 2003/0163739 A1 | 8/2003 | Armington et al. |
| 2003/0165241 A1 | 9/2003 | Fransdonk |
| 2003/0172376 A1 | 9/2003 | Coffin |
| 2003/0174838 A1 | 9/2003 | Bremer |
| 2003/0179773 A1 | 9/2003 | Mocek et al. |
| 2003/0188023 A1 | 10/2003 | Grecco et al. |
| 2003/0192060 A1* | 10/2003 | Levy .................. H04N 5/783 725/112 |
| 2003/0204602 A1* | 10/2003 | Hudson .................. H04L 9/40 709/224 |
| 2003/0208767 A1 | 11/2003 | Williamson et al. |
| 2003/0217365 A1 | 11/2003 | Caputo |
| 2003/0220100 A1 | 11/2003 | McElhatten et al. |
| 2003/0221100 A1 | 11/2003 | Russ et al. |
| 2003/0229681 A1 | 12/2003 | Levitan |
| 2003/0237090 A1 | 12/2003 | Boston et al. |
| 2004/0001087 A1 | 1/2004 | Warmus et al. |
| 2004/0003402 A1 | 1/2004 | McKenna, Jr. |
| 2004/0006694 A1 | 1/2004 | Heelan et al. |
| 2004/0015365 A1 | 1/2004 | Ohmori et al. |
| 2004/0019691 A1 | 1/2004 | Daymond et al. |
| 2004/0034873 A1 | 2/2004 | Zenoni |
| 2004/0047599 A1 | 3/2004 | Grzeczkowski |
| 2004/0060076 A1 | 3/2004 | Song |
| 2004/0073915 A1 | 4/2004 | Dureau |
| 2004/0078809 A1 | 4/2004 | Drazin |
| 2004/0103120 A1 | 5/2004 | Fickle et al. |
| 2004/0109569 A1 | 6/2004 | Ellison et al. |
| 2004/0109672 A1 | 6/2004 | Kim et al. |
| 2004/0113936 A1 | 6/2004 | Dempski |
| 2004/0114539 A1 | 6/2004 | Beshai et al. |
| 2004/0117817 A1 | 6/2004 | Kwon et al. |
| 2004/0133467 A1 | 7/2004 | Siler |
| 2004/0133907 A1 | 7/2004 | Rodriguez et al. |
| 2004/0138909 A1 | 7/2004 | Mayer |
| 2004/0146006 A1 | 7/2004 | Jackson |
| 2004/0148625 A1 | 7/2004 | Eldering et al. |
| 2004/0162900 A1 | 8/2004 | Bucher et al. |
| 2004/0163109 A1 | 8/2004 | Kang et al. |
| 2004/0163111 A1 | 8/2004 | Palazzo et al. |
| 2004/0166881 A1 | 8/2004 | Farchmin |
| 2004/0177383 A1 | 9/2004 | Martinolich et al. |
| 2004/0181811 A1 | 9/2004 | Rakib |
| 2004/0186774 A1 | 9/2004 | Lee |
| 2004/0187159 A1 | 9/2004 | Gaydos et al. |
| 2004/0189873 A1 | 9/2004 | Konig et al. |
| 2004/0193609 A1 | 9/2004 | Phan et al. |
| 2004/0194134 A1 | 9/2004 | Gunatilake et al. |
| 2004/0199789 A1 | 10/2004 | Shaw et al. |
| 2004/0218827 A1 | 11/2004 | Cohen et al. |
| 2004/0230994 A1 | 11/2004 | Urdang et al. |
| 2004/0246933 A1 | 12/2004 | Valko et al. |
| 2005/0007278 A1 | 1/2005 | Anson et al. |
| 2005/0021940 A1 | 1/2005 | Ma |
| 2005/0022237 A1 | 1/2005 | Nomura |
| 2005/0027696 A1 | 2/2005 | Swaminathan et al. |
| 2005/0028208 A1 | 2/2005 | Ellis et al. |
| 2005/0034171 A1 | 2/2005 | Benya |
| 2005/0034173 A1 | 2/2005 | Hatanaka |
| 2005/0039205 A1 | 2/2005 | Riedl |
| 2005/0047596 A1 | 3/2005 | Suzuki |
| 2005/0055685 A1 | 3/2005 | Maynard et al. |
| 2005/0060742 A1 | 3/2005 | Riedl et al. |
| 2005/0060745 A1 | 3/2005 | Riedl et al. |
| 2005/0066339 A1 | 3/2005 | Thoen |
| 2005/0086334 A1 | 4/2005 | Aaltonen et al. |
| 2005/0086691 A1 | 4/2005 | Dudkiewicz et al. |
| 2005/0091173 A1 | 4/2005 | Alve |
| 2005/0105396 A1 | 5/2005 | Schybergson |
| 2005/0111844 A1 | 5/2005 | Compton et al. |
| 2005/0114141 A1 | 5/2005 | Grody |
| 2005/0114686 A1 | 5/2005 | Ball et al. |
| 2005/0114900 A1 | 5/2005 | Ladd et al. |
| 2005/0123001 A1 | 6/2005 | Craven et al. |
| 2005/0125832 A1 | 6/2005 | Jost et al. |
| 2005/0132191 A1 | 6/2005 | Joshi et al. |
| 2005/0144333 A1 | 6/2005 | Kotzin |
| 2005/0144632 A1 | 6/2005 | Mears et al. |
| 2005/0144635 A1 | 6/2005 | Boortz et al. |
| 2005/0168323 A1 | 8/2005 | Lenoir et al. |
| 2005/0172312 A1 | 8/2005 | Lienhart et al. |
| 2005/0176444 A1 | 8/2005 | Tanaka |
| 2005/0183120 A1 | 8/2005 | Jain et al. |
| 2005/0198686 A1 | 9/2005 | Krause et al. |
| 2005/0210502 A1 | 9/2005 | Flickinger et al. |
| 2005/0223409 A1 | 10/2005 | Rautila et al. |
| 2005/0229209 A1 | 10/2005 | Hildebolt et al. |
| 2005/0234998 A1 | 10/2005 | Lesandrini et al. |
| 2005/0235318 A1 | 10/2005 | Grauch et al. |
| 2005/0238238 A1 | 10/2005 | Xu et al. |
| 2005/0261970 A1 | 11/2005 | Vucina et al. |
| 2005/0262418 A1 | 11/2005 | Gehrmann |
| 2005/0262542 A1 | 11/2005 | DeWeese et al. |
| 2005/0268107 A1 | 12/2005 | Harris et al. |
| 2005/0273629 A1 | 12/2005 | Abrams et al. |
| 2005/0273819 A1 | 12/2005 | Knudson et al. |
| 2005/0276284 A1 | 12/2005 | Krause et al. |
| 2005/0289588 A1 | 12/2005 | Kinnear |
| 2005/0289618 A1 | 12/2005 | Hardin |
| 2005/0289619 A1 | 12/2005 | Melby |
| 2006/0004662 A1 | 1/2006 | Nadalin et al. |
| 2006/0015502 A1 | 1/2006 | Szucs |
| 2006/0015637 A1 | 1/2006 | Chung |
| 2006/0019702 A1 | 1/2006 | Anttila et al. |
| 2006/0031558 A1 | 2/2006 | Ortega et al. |
| 2006/0031883 A1 | 2/2006 | Ellis et al. |
| 2006/0036488 A1* | 2/2006 | Golan .................. G06Q 30/02 705/14.67 |
| 2006/0036750 A1 | 2/2006 | Ladd et al. |
| 2006/0037060 A1 | 2/2006 | Simms et al. |
| 2006/0047957 A1* | 3/2006 | Helms .................. H04N 7/1675 348/E7.056 |
| 2006/0059342 A1 | 3/2006 | Medvinsky et al. |
| 2006/0080408 A1 | 4/2006 | Istvan et al. |
| 2006/0112038 A1 | 5/2006 | Luo |
| 2006/0117341 A1 | 6/2006 | Park |
| 2006/0130107 A1 | 6/2006 | Gonder et al. |
| 2006/0130113 A1 | 6/2006 | Carlucci et al. |
| 2006/0154674 A1 | 7/2006 | Landschaft et al. |
| 2006/0159048 A1 | 7/2006 | Han et al. |
| 2006/0165197 A1 | 7/2006 | Morita et al. |
| 2006/0168119 A1 | 7/2006 | Inoue et al. |
| 2006/0171390 A1 | 8/2006 | La Joie |
| 2006/0171423 A1 | 8/2006 | Helms et al. |
| 2006/0173974 A1 | 8/2006 | Tang |
| 2006/0190336 A1 | 8/2006 | Pisaris-Henderson et al. |
| 2006/0197828 A1 | 9/2006 | Zeng et al. |
| 2006/0218604 A1 | 9/2006 | Riedl et al. |
| 2006/0218632 A1 | 9/2006 | Corley et al. |
| 2006/0236131 A1 | 10/2006 | Vauclair |
| 2006/0242267 A1 | 10/2006 | Grossman |
| 2006/0248555 A1 | 11/2006 | Eldering |
| 2006/0253328 A1 | 11/2006 | Kohli et al. |
| 2006/0253545 A1 | 11/2006 | Lakamp |
| 2006/0253584 A1 | 11/2006 | Dixon et al. |
| 2006/0253864 A1 | 11/2006 | Easty |
| 2006/0256814 A1 | 11/2006 | Caci |
| 2006/0259924 A1 | 11/2006 | Boortz et al. |

(56) References Cited

U.S. PATENT DOCUMENTS

| | | |
|---|---|---|
| 2006/0277098 A1* | 12/2006 | Chung .............. G06Q 30/0267 705/14.69 |
| 2006/0277569 A1 | 12/2006 | Smith |
| 2006/0288374 A1 | 12/2006 | Ferris et al. |
| 2006/0294259 A1 | 12/2006 | Matefi et al. |
| 2007/0022459 A1 | 1/2007 | Gaebel, Jr. et al. |
| 2007/0027809 A1 | 2/2007 | Alve |
| 2007/0029379 A1 | 2/2007 | Peyer |
| 2007/0033531 A1 | 2/2007 | Marsh |
| 2007/0038931 A1 | 2/2007 | Allaire et al. |
| 2007/0061023 A1 | 3/2007 | Hoffberg et al. |
| 2007/0061197 A1 | 3/2007 | Ramer et al. |
| 2007/0061336 A1 | 3/2007 | Ramer et al. |
| 2007/0067297 A1 | 3/2007 | Kublickis et al. |
| 2007/0074258 A1 | 3/2007 | Wood et al. |
| 2007/0076728 A1 | 4/2007 | Rieger et al. |
| 2007/0086372 A1 | 4/2007 | Lee et al. |
| 2007/0089127 A1 | 4/2007 | Flickinger et al. |
| 2007/0094691 A1 | 4/2007 | Gazdzinski |
| 2007/0101370 A1 | 5/2007 | Calderwood |
| 2007/0113243 A1 | 5/2007 | Brey |
| 2007/0115389 A1 | 5/2007 | McCarthy et al. |
| 2007/0115922 A1 | 5/2007 | Schneider et al. |
| 2007/0118852 A1 | 5/2007 | Calderwood |
| 2007/0121612 A1 | 5/2007 | Nadeau et al. |
| 2007/0136743 A1 | 6/2007 | Hasek et al. |
| 2007/0150919 A1 | 6/2007 | Morishita et al. |
| 2007/0157242 A1 | 7/2007 | Cordray et al. |
| 2007/0157262 A1 | 7/2007 | Ramaswamy et al. |
| 2007/0180230 A1 | 8/2007 | Cortez |
| 2007/0204310 A1 | 8/2007 | Hua et al. |
| 2007/0217436 A1 | 9/2007 | Markley et al. |
| 2007/0220158 A1 | 9/2007 | Tolgu et al. |
| 2007/0233857 A1 | 10/2007 | Cheng et al. |
| 2007/0244760 A1 | 10/2007 | Bodnar et al. |
| 2007/0255755 A1 | 11/2007 | Zhang et al. |
| 2007/0260604 A1 | 11/2007 | Haeuser et al. |
| 2007/0266395 A1 | 11/2007 | Lee et al. |
| 2007/0271388 A1 | 11/2007 | Bowra et al. |
| 2007/0274537 A1 | 11/2007 | Srinivasan |
| 2007/0276926 A1 | 11/2007 | Lajoie et al. |
| 2007/0276928 A1* | 11/2007 | Rhoads .............. H04N 1/32144 709/219 |
| 2007/0280298 A1 | 12/2007 | Hearn et al. |
| 2007/0294178 A1 | 12/2007 | Pinder et al. |
| 2008/0016526 A1 | 1/2008 | Asmussen |
| 2008/0019661 A1 | 1/2008 | Obrador et al. |
| 2008/0021836 A1 | 1/2008 | Lao |
| 2008/0052157 A1 | 2/2008 | Kadambi et al. |
| 2008/0092181 A1 | 4/2008 | Britt |
| 2008/0101460 A1 | 5/2008 | Rodriguez |
| 2008/0104634 A1 | 5/2008 | Gajdos et al. |
| 2008/0109307 A1 | 5/2008 | Ullah |
| 2008/0115169 A1 | 5/2008 | Ellis et al. |
| 2008/0124056 A1 | 5/2008 | Concotelli et al. |
| 2008/0134274 A1 | 6/2008 | Derrenberger et al. |
| 2008/0141317 A1 | 6/2008 | Radloff et al. |
| 2008/0141353 A1 | 6/2008 | Brown |
| 2008/0147497 A1 | 6/2008 | Tischer |
| 2008/0155588 A1 | 6/2008 | Roberts et al. |
| 2008/0155614 A1 | 6/2008 | Cooper et al. |
| 2008/0162623 A1 | 7/2008 | Flynn et al. |
| 2008/0163305 A1 | 7/2008 | Johnson et al. |
| 2008/0170551 A1 | 7/2008 | Zaks |
| 2008/0182591 A1 | 7/2008 | Krikorian |
| 2008/0183705 A1 | 7/2008 | Shivaji-Rao et al. |
| 2008/0188964 A1 | 8/2008 | Bech et al. |
| 2008/0192770 A1* | 8/2008 | Burrows .............. H04L 65/1069 370/466 |
| 2008/0192820 A1 | 8/2008 | Brooks et al. |
| 2008/0229354 A1 | 9/2008 | Morris et al. |
| 2008/0235722 A1 | 9/2008 | Baugher et al. |
| 2008/0244667 A1 | 10/2008 | Osborne |
| 2008/0250447 A1 | 10/2008 | Rowe et al. |
| 2008/0263578 A1 | 10/2008 | Bayer et al. |
| 2008/0271068 A1 | 10/2008 | Ou et al. |
| 2008/0273591 A1 | 11/2008 | Brooks et al. |
| 2008/0306903 A1 | 12/2008 | Larson et al. |
| 2008/0313671 A1 | 12/2008 | Batrouny et al. |
| 2008/0313691 A1 | 12/2008 | Cholas et al. |
| 2009/0022472 A1 | 1/2009 | Bronstein et al. |
| 2009/0025027 A1 | 1/2009 | Craner |
| 2009/0025075 A1 | 1/2009 | Chow et al. |
| 2009/0030802 A1 | 1/2009 | Plotnick et al. |
| 2009/0064219 A1 | 3/2009 | Minor |
| 2009/0064251 A1 | 3/2009 | Savoor et al. |
| 2009/0086643 A1 | 4/2009 | Kotrla et al. |
| 2009/0132346 A1 | 5/2009 | Duggal et al. |
| 2009/0133048 A1 | 5/2009 | Gibbs et al. |
| 2009/0150917 A1 | 6/2009 | Huffman et al. |
| 2009/0170479 A1 | 7/2009 | Jarenskog |
| 2009/0187939 A1 | 7/2009 | Lajoie |
| 2009/0198794 A1 | 8/2009 | Beals |
| 2009/0210899 A1 | 8/2009 | Lawrence-Apfelbaum et al. |
| 2009/0216761 A1* | 8/2009 | Raichelgauz ........ G06Q 30/0201 707/999.005 |
| 2009/0222853 A1 | 9/2009 | White et al. |
| 2009/0244290 A1 | 10/2009 | McKelvey et al. |
| 2009/0244291 A1 | 10/2009 | Saptharishi et al. |
| 2009/0260030 A1 | 10/2009 | Karlsson et al. |
| 2009/0313654 A1 | 12/2009 | Paila et al. |
| 2009/0319379 A1 | 12/2009 | Joao |
| 2009/0320059 A1 | 12/2009 | Bolyukh |
| 2009/0327346 A1 | 12/2009 | Teinila et al. |
| 2009/0328113 A1 | 12/2009 | Van De Klashorst |
| 2010/0005527 A1 | 1/2010 | Jeon |
| 2010/0014496 A1 | 1/2010 | Kalika et al. |
| 2010/0027560 A1 | 2/2010 | Yang et al. |
| 2010/0070867 A1 | 3/2010 | Lemmers |
| 2010/0081416 A1 | 4/2010 | Cohen |
| 2010/0082440 A1 | 4/2010 | Vaidyanathan et al. |
| 2010/0082983 A1 | 4/2010 | Shah et al. |
| 2010/0115091 A1 | 5/2010 | Park et al. |
| 2010/0122276 A1 | 5/2010 | Chen |
| 2010/0122285 A1 | 5/2010 | Begeja et al. |
| 2010/0122288 A1 | 5/2010 | Minter et al. |
| 2010/0125658 A1 | 5/2010 | Strasters |
| 2010/0150027 A1 | 6/2010 | Atwal et al. |
| 2010/0151816 A1 | 6/2010 | Besehanic et al. |
| 2010/0153544 A1* | 6/2010 | Krassner .............. G06F 40/143 709/224 |
| 2010/0159951 A1 | 6/2010 | Shkedi |
| 2010/0161492 A1 | 6/2010 | Harvey et al. |
| 2010/0175084 A1 | 7/2010 | Ellis et al. |
| 2010/0175584 A1 | 7/2010 | Kusaka et al. |
| 2010/0218231 A1 | 8/2010 | Frink et al. |
| 2010/0251304 A1 | 9/2010 | Donoghue et al. |
| 2010/0251305 A1 | 9/2010 | Kimble et al. |
| 2010/0262488 A1 | 10/2010 | Harrison et al. |
| 2010/0269128 A1 | 10/2010 | Gordon |
| 2010/0269131 A1 | 10/2010 | Newberry et al. |
| 2010/0280641 A1 | 11/2010 | Harkness et al. |
| 2010/0293165 A1* | 11/2010 | Eldering .......... H04N 21/44224 707/E17.089 |
| 2010/0293221 A1 | 11/2010 | Sidman et al. |
| 2010/0299757 A1 | 11/2010 | Lee |
| 2010/0309051 A1 | 12/2010 | Moshfeghi |
| 2010/0313225 A1 | 12/2010 | Cholas et al. |
| 2010/0313226 A1 | 12/2010 | Cholas et al. |
| 2011/0015989 A1 | 1/2011 | Tidwell et al. |
| 2011/0016479 A1 | 1/2011 | Tidwell et al. |
| 2011/0016482 A1 | 1/2011 | Tidwell et al. |
| 2011/0090898 A1 | 4/2011 | Patel et al. |
| 2011/0093900 A1 | 4/2011 | Patel et al. |
| 2011/0099017 A1 | 4/2011 | Ure |
| 2011/0103374 A1 | 5/2011 | Lajoie et al. |
| 2011/0106784 A1 | 5/2011 | Terheggen et al. |
| 2011/0107364 A1 | 5/2011 | Lajoie et al. |
| 2011/0107379 A1 | 5/2011 | Lajoie et al. |
| 2011/0107389 A1 | 5/2011 | Chakarapani |
| 2011/0110515 A1 | 5/2011 | Tidwell et al. |
| 2011/0112717 A1 | 5/2011 | Resner |
| 2011/0138064 A1 | 6/2011 | Rieger et al. |
| 2011/0163888 A1 | 7/2011 | Goedde |

(56) References Cited

U.S. PATENT DOCUMENTS

| | | |
|---|---|---|
| 2011/0167440 A1 | 7/2011 | Greenfield |
| 2011/0178880 A1 | 7/2011 | Karaoguz et al. |
| 2011/0178943 A1 | 7/2011 | Motahari et al. |
| 2011/0197070 A1 | 8/2011 | Mizrah |
| 2011/0197224 A1 | 8/2011 | Meijer |
| 2011/0202270 A1 | 8/2011 | Sharma et al. |
| 2011/0206136 A1 | 8/2011 | Bekedam et al. |
| 2011/0211809 A1 | 9/2011 | Sikora et al. |
| 2011/0225619 A1 | 9/2011 | Kesireddy et al. |
| 2011/0231265 A1 | 9/2011 | Brown et al. |
| 2011/0235577 A1 | 9/2011 | Hintermeister et al. |
| 2011/0247029 A1 | 10/2011 | Yarvis et al. |
| 2011/0264530 A1 | 10/2011 | Santangelo et al. |
| 2011/0265116 A1 | 10/2011 | Stern et al. |
| 2011/0286437 A1 | 11/2011 | Austin et al. |
| 2011/0307339 A1 | 12/2011 | Russell et al. |
| 2011/0317977 A1 | 12/2011 | Harris |
| 2012/0005527 A1* | 1/2012 | Engel ............... H04N 21/2408 714/E11.02 |
| 2012/0011269 A1 | 1/2012 | Krikorian et al. |
| 2012/0011567 A1 | 1/2012 | Cronk et al. |
| 2012/0023535 A1 | 1/2012 | Brooks |
| 2012/0030363 A1 | 2/2012 | Conrad |
| 2012/0030716 A1 | 2/2012 | Zhang et al. |
| 2012/0046049 A1 | 2/2012 | Curtis et al. |
| 2012/0054785 A1 | 3/2012 | Yang et al. |
| 2012/0079546 A1 | 3/2012 | Kalidindi et al. |
| 2012/0084813 A1 | 4/2012 | Dmitriev et al. |
| 2012/0110620 A1 | 5/2012 | Kilar et al. |
| 2012/0115501 A1 | 5/2012 | Zheng |
| 2012/0117584 A1 | 5/2012 | Gordon |
| 2012/0124606 A1 | 5/2012 | Tidwell et al. |
| 2012/0128241 A1 | 5/2012 | Jung |
| 2012/0151549 A1 | 6/2012 | Kumar et al. |
| 2012/0159603 A1 | 6/2012 | Queck |
| 2012/0167173 A1 | 6/2012 | Nadalin et al. |
| 2012/0202447 A1 | 8/2012 | Edge et al. |
| 2012/0222081 A1 | 8/2012 | Schaefer et al. |
| 2012/0302259 A1 | 11/2012 | Busch |
| 2012/0310762 A1* | 12/2012 | Robbin ................ G06F 21/10 705/26.1 |
| 2012/0324552 A1* | 12/2012 | Padala ............... H04L 9/3213 726/6 |
| 2012/0330759 A1 | 12/2012 | Aggarwal et al. |
| 2013/0023247 A1 | 1/2013 | Bolon et al. |
| 2013/0045681 A1 | 2/2013 | Dua |
| 2013/0046623 A1 | 2/2013 | Moritz et al. |
| 2013/0060385 A1 | 3/2013 | Leen et al. |
| 2013/0081097 A1 | 3/2013 | Park et al. |
| 2013/0095848 A1 | 4/2013 | Gold et al. |
| 2013/0100818 A1 | 4/2013 | Qiu et al. |
| 2013/0104162 A1* | 4/2013 | Helms ............... H04L 9/3263 725/31 |
| 2013/0227283 A1 | 8/2013 | Williamson et al. |
| 2013/0227608 A1 | 8/2013 | Evans et al. |
| 2013/0254787 A1 | 9/2013 | Cox et al. |
| 2013/0272575 A1 | 10/2013 | Li et al. |
| 2013/0275557 A1* | 10/2013 | Myers ............... H04N 21/85406 709/219 |
| 2013/0325995 A1 | 12/2013 | Ispas et al. |
| 2013/0326554 A1 | 12/2013 | Shkedi |
| 2013/0347089 A1 | 12/2013 | Bailey et al. |
| 2014/0020017 A1 | 1/2014 | Stern et al. |
| 2014/0046624 A1 | 2/2014 | Miettinen |
| 2014/0052696 A1 | 2/2014 | Soroushian |
| 2014/0066098 A1 | 3/2014 | Stern et al. |
| 2014/0075466 A1 | 3/2014 | Zhao |
| 2014/0129351 A1* | 5/2014 | Ringdahl ............ G06Q 30/0275 705/14.71 |
| 2014/0129352 A1* | 5/2014 | Ringdahl ............ G06Q 30/0275 705/14.71 |
| 2014/0150014 A1* | 5/2014 | Aitken ................ H04H 20/423 725/109 |
| 2014/0150019 A1* | 5/2014 | Ma ..................... H04N 21/458 725/34 |
| 2014/0215506 A1 | 7/2014 | Kalmes et al. |
| 2014/0282695 A1 | 9/2014 | Bakar et al. |
| 2014/0282721 A1 | 9/2014 | Kuncl et al. |
| 2014/0309868 A1 | 10/2014 | Ricci |
| 2014/0358678 A1* | 12/2014 | Raab ................. G06Q 30/0248 705/14.47 |
| 2014/0359649 A1 | 12/2014 | Cronk et al. |
| 2015/0019982 A1* | 1/2015 | Petitt, Jr. .............. G06F 21/00 715/738 |
| 2015/0032533 A1* | 1/2015 | Raab ................. G06Q 30/0248 705/14.47 |
| 2015/0032550 A1* | 1/2015 | Shah .................... H04W 4/029 705/14.66 |
| 2015/0046938 A1 | 2/2015 | Qian et al. |
| 2015/0058883 A1 | 2/2015 | Tidwell et al. |
| 2015/0058909 A1 | 2/2015 | Miller et al. |
| 2015/0094098 A1* | 4/2015 | Stern .................... H04W 4/18 455/456.3 |
| 2015/0103685 A1 | 4/2015 | Butchko et al. |
| 2015/0106846 A1 | 4/2015 | Chen et al. |
| 2015/0185993 A1 | 7/2015 | Wheatley et al. |
| 2015/0189377 A1 | 7/2015 | Wheatley et al. |
| 2015/0304698 A1 | 10/2015 | Redol |
| 2015/0365833 A1 | 12/2015 | Stafford et al. |
| 2015/0382034 A1 | 12/2015 | Thangaraj et al. |
| 2016/0019103 A1 | 1/2016 | Basra |
| 2016/0055606 A1 | 2/2016 | Petrovic et al. |
| 2016/0094893 A1 | 3/2016 | Tse |
| 2016/0127185 A1 | 5/2016 | McAllister et al. |
| 2016/0127260 A1* | 5/2016 | Gordon ............... H04N 21/234 709/231 |
| 2016/0127440 A1* | 5/2016 | Gordon ................ H04L 65/75 709/219 |
| 2016/0135230 A1* | 5/2016 | Swierczynski ....... H04W 76/45 455/518 |
| 2016/0182973 A1 | 6/2016 | Winograd et al. |
| 2016/0226922 A1* | 8/2016 | Russell ............. H04L 65/1069 |
| 2016/0261425 A1 | 9/2016 | Horton et al. |
| 2016/0301962 A1* | 10/2016 | Helms ............. H04N 21/23473 |
| 2017/0006317 A1 | 1/2017 | Lajoie et al. |
| 2017/0039444 A1 | 2/2017 | Li et al. |
| 2017/0070789 A1 | 3/2017 | Liassides et al. |
| 2017/0164378 A1 | 6/2017 | Gunasekara et al. |
| 2017/0164416 A1 | 6/2017 | Yeddala et al. |
| 2017/0308681 A1* | 10/2017 | Gould ................ G06Q 30/0248 |
| 2017/0339417 A1* | 11/2017 | Puri .................... G06V 10/446 |
| 2018/0035174 A1 | 2/2018 | Littlejohn |
| 2018/0131975 A1* | 5/2018 | Badawiyeh ........ H04N 21/2385 |
| 2018/0144194 A1 | 5/2018 | Park |
| 2018/0241840 A1* | 8/2018 | Hasek ................... H04L 67/52 |
| 2019/0007724 A1 | 1/2019 | Tidwell et al. |
| 2019/0014381 A1* | 1/2019 | Tidwell ............ H04N 21/41407 |
| 2019/0095715 A1 | 3/2019 | Nunes et al. |
| 2019/0158906 A1* | 5/2019 | Gonder ............. H04N 21/2187 |
| 2019/0173930 A1* | 6/2019 | Gordon .................. H04L 65/80 |
| 2019/0251602 A1 | 8/2019 | Corm |
| 2019/0268392 A1 | 8/2019 | Tidwell et al. |
| 2019/0289263 A1 | 9/2019 | Amini et al. |
| 2019/0356956 A1 | 11/2019 | Sheng et al. |
| 2019/0394530 A1 | 12/2019 | Kimble et al. |
| 2020/0043056 A1 | 2/2020 | Marsh et al. |
| 2020/0059693 A1 | 2/2020 | Neumeier et al. |
| 2020/0329260 A1 | 10/2020 | Mathur |

OTHER PUBLICATIONS

Xue, Kaiping., et al. "A temporal-credential-based mutual authentication and key agreement scheme for Wireless Network Sensors." Journal of Network and Computer Applications, No. 36, 2013, pp. 316-323 . . . (Year: 2013).*

David P.A., "The Beginnings and Prospective Ending of 'End-to-End': An Evolutionary Perspective on the Internet's Architecture," Stanford Institute for Economic Policy Research, Aug. 2001, 34 pages.

Ford B., "Unmanaged Internet Protocol: Scalable Application-

(56) References Cited

OTHER PUBLICATIONS

Friendly Internet Routing," Jul. 24, 2003, 6 pages.
Ford B., "Unmanaged Internet Protocol: Taming the Edge Network Management Crisis," ACM SIGCOMM Computer Communications Review, vol. 34 (1), Jan. 2004, pp. 93-98.
Merriam-Webster, "apparatus", 2019 (Year: 2019).
Merriam-Webster, "mapping", 2020 (Year: 2020).
Microsoft Computer Dictionary, "Device", Fifth edition, 2002, 648 pages.
Sadok D.H., et al., "Trends in Network and Device Composition," Topics in Internet Technology, IEEE Communications Magazine, Oct. 2006, pp. 112-118.
Wikipedia, "Client (computing)", 2020, 2 pages.
Cisco Intelligent Network Architecture for Digital Video-SCTE Cable-Tec Expo 2004 information page, Orange County Convention Center, Jun. 2004, 24 pages.
Deering et al., Internet Protocol, Version 6 (IPv6) Specification, Dec. 1998, 39 pages . . . .
Gomez, Conserving Transmission Power in Wireless Ad Hoc Networks, 2001, Network Protocols.
Griffith D.W., et al., "Resource Planning and Bandwidth Allocation in Hybrid Fiber-Coax Residential Networks," National Institute of Standards and Technology (NIST), Oct. 1, 2005, 10 pages.
Iab., "Open Direct API Specification Version 1.0", 95 pages, finalized Jan. 2015.
Iab., "Open Rtb Api Specification Version 2.4" (Final Draft) dated Mar. 2016, 75 pages.
Iab., "Open RTB Dynamic Native Ads API Specification Version 1", 35 pages, dated Feb. 2015.
Iab., "Open RTB Dynamic Native Ads API Specification Version 1.1" dated Mar. 2016, 36 pages.
Iab., "Traffic Fraud: Best Practices for Reducing Risk to Exposure", 12 pages, dated Jan. 30, 2014.
Iab.."Digital Video In-Stream Ad Format Guidelines," 23 pages, released Jan. 8, 2016.
Informal Standard, Document: id3v2.3, by: M. Nilsson, dated Feb. 3, 1999, 39 pages, http://id3.org/id3v2.3.0.
Internet Protocol DARPA Internet Program Protocol Specification, Sep. 1981, 51 pages . . . .
JICWEBS "Traffic Fraud: Best Practices for Reducing Risk to Exposure", 14 pages, Version 1, Issued Jun. 2015.
Kanouff, Communications Technology: Next-Generation Bandwidth Management—The Evolution of the Anything-to-Anywhere Network, 8 pages, Apr. 1, 2004.
Miao, et al., "Distributed interference-aware energy-efficient power optimization," IEEE Transactions on Wireless Communications, Apr. 2011, vol. 10 (4), pp. 1323-1333.
Motorola DOCSIS Cable Module DCM 2000 specifications, 4 pages, copyright 2001.
Open Cable Specification entitled "Enhanced TV Binary Interchange Format 1 0" 0C-SP-ETV-131F1.0-106-110128 dated Jan. 28, 2011, 408 pages.
OpenVision Session Resource Manager—Open Standards-Based Solution Optimizes Network Resources by Dynamically Assigning Bandwidth in the Delivery of Digital Services article, 2 pages, (copyright 2006), (http://www.imake.com/hopenvision).
OpenVision Session Resource Manager features and information, 2 pages, (http://www.imake.com/hopenvision).
SCTE 130-1 2013. Part 1: Digital Program Insertion—Advertising Systems Interfaces, Part 1—Advertising Systems Overview, 20 pages.
SCTE Standards Document ANSI/SCTE 118-2 2007 entitled "Program-Specific Ad Insertion—Content Provider to Traffic Communication Applications Data Model," 20 pages.
SCTE Standards Document ANSI/SCTE 130-2 2014 entitled "Digital Program Insertion—Advertising Systems Interfaces, Part 2—Core Data Elements," 78 pages.
Tandberg Television specification entitled "AdPoint.RTM. Advanced Advertising Platform" dated Mar. 2008, 2 pages.
UTF-32, IBM, retrieved from http://publib.boulder.IBM.com/infocenter/iseries/v5r3/index.jsp?topic=%2Fnls%2Frbagsutf32.htm on Aug. 28, 2013.
Dictionary, "Recording", 2021.
Dictionary, "Recorded", 2021.
Chen Y.T., et al., "A Cascade of Feed-forward Classifiers for Fast Pedestrian Detection," Asian Conference on Computer Vision, 2007, Part 1, pp. 905-914.
Viola P., et al., "Rapid Object Detection using a Boosted Cascade of Simple Features," IEEE, 2001, 9 pages.

\* cited by examiner

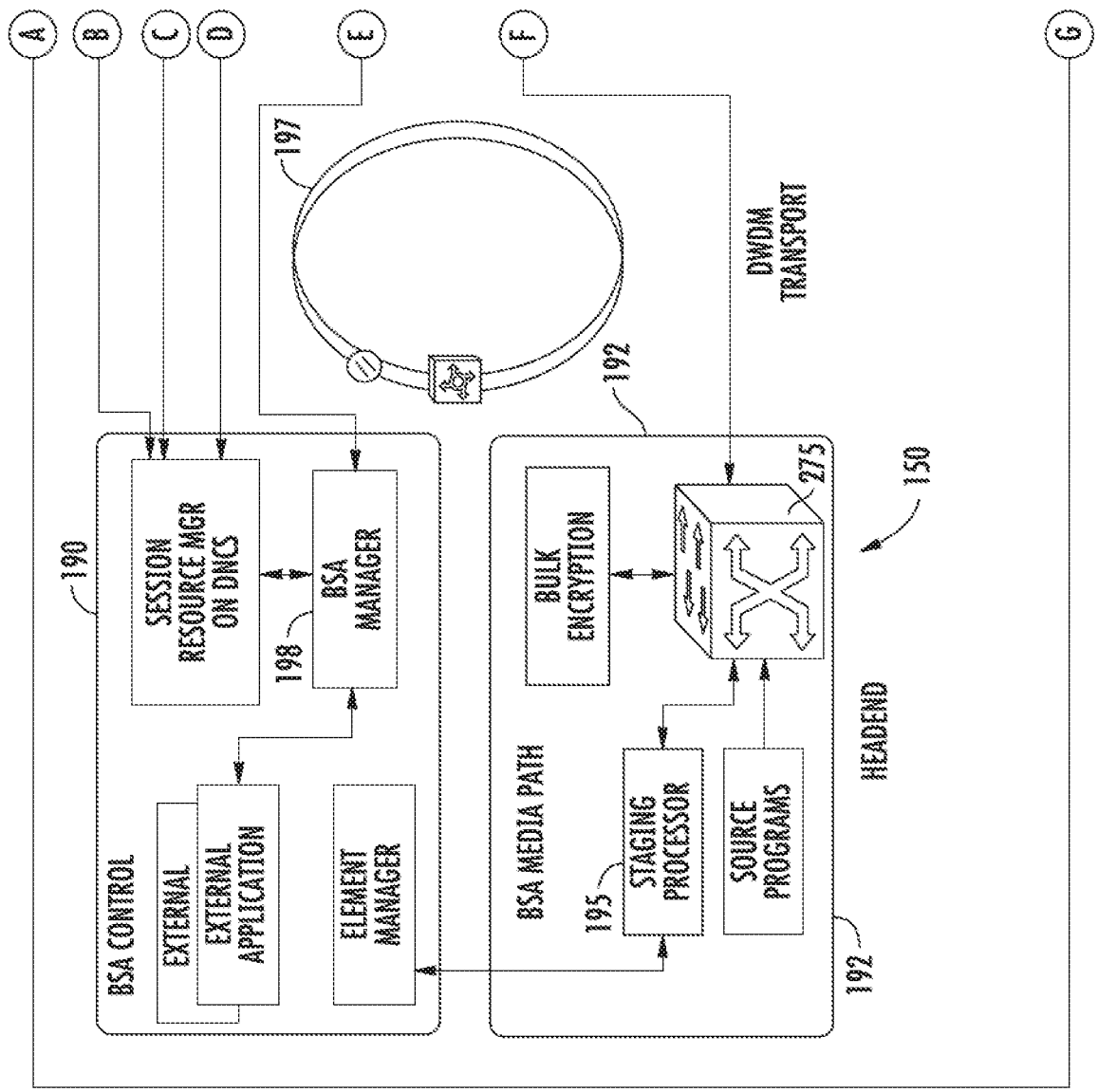

METHODS AND APPARATUS FOR SECONDARY CONTENT MANAGEMENT AND FRAUD PREVENTION

PRIORITY

The present application is a continuation of and claims priority to co-owned and co-pending U.S. patent application Ser. No. 15/135,186 of the same title filed on Apr. 21, 2016, issuing as U.S. Pat. No. 10,586,023 on Mar. 10, 2020, which is incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technological Field

The disclosure relates generally to the field of content delivery and management, and in one exemplary aspect, methods and apparatus for fraud prevention, such as e.g., preventing illegitimate advertisement view counts, and for ensuring accurate accounting with regards to the amount of an advertisement viewed or otherwise consumed by a client.

2. Description of Related Technology

In managed content distribution networks (such as e.g., cable television HFCu, or satellite networks), advertisements are usually interspersed within a given broadcasted or delivered program. In this manner, every user premises device (e.g., a subscriber's settop box or the like) in a local service area which is currently tuned to the same program channel will receive the same advertisements at approximately the same time and in the same order.

Advertisements or other "secondary content" (including, without limitation, promotions or "info-mercials", commercials, telescoping information/advertisements, and short segments) that are ultimately viewed by subscribers or other content consumers in such networks can be controlled in several ways. Generally, two categories or subdivisions of these techniques exist: (i) national- or high-level insertion, and (ii) local- or low-level insertion.

Under national level insertion, national networks (such as NBC, ABC, etc.) are responsible for determining the advertisements or promotions that are resident in a given program or other primary content stream or discrete content element. The pre-configured stream is delivered to the network operator (e.g., MSO), and the MSO merely then delivers the stream (content and advertisements) to the relevant subscribers over their network.

Under local-level insertion, the MSO (and even broadcast affiliates) can insert locally-generated advertisements or commercials and other such segments into remotely distributed regional programs before they are delivered to the network subscribers.

Secondary content insertion may comprise a major source of revenue for Internet website operators (e.g., YouTube™), commercial television/content distributors, and for the network operator. For example, where the secondary content comprises advertisements, it may be a main source of income for national television broadcasters and their local over-the-air affiliates. Cable, satellite, and other content distribution networks, as well as Internet content providers, also derive income from the sale of advertising time.

In order for an advertiser to maximize the return on their advertising investment, advertisers, promoters or other entities need to be assured that the secondary content for which they are paying to have displayed are actually being consumed by a client device at the direction of a human who is viewing the secondary content and associated primary or program content. An advertisement accounting service (also referred to as an Advertisement Decisioning Service (ADS) in some contexts) is used within content distribution network infrastructure to determine which individual ones of the secondary (or other) content will be placed in each of the advertisement placement opportunities prior to the delivery of content to the client device. The ADS may include, for example, an ad server or the like. In addition, the ADS is used to keep track of other data, such as e.g., the number of times an individual one of the secondary content is requested by the client device. Somewhat analogous to an Internet advertisement "click through", this information is used to invoice the advertiser who pays the advertisement distributor based upon the number of advertisements served. However, most of the methods of displaying secondary content are susceptible to computer-automated programs (e.g., "bots") created by malicious agents. Theses computer-automated programs "spoof" or trick the ADS by communicating data or messaging to the ADS that an advertisement is being requested, when in fact there are no legitimate viewers consuming the advertising. This scenario constitutes one type of "advertisement viewing fraud." Extant advertising management systems such as the aforementioned ADS do not actually verify that the request for the advertisement is in fact legitimate, but rather merely log such requests and presume that delivery actually occurs, and such delivery is to a legitimate consumer. For example, a typical prior art management system receives a request from a client (e.g., subscriber device) for a manifest file, which contains information such as URLs (universal resource locators) for primary and secondary content elements (e.g., video content and advertisements, respectively). The manifest file request is directed to an entity which coordinates obtaining information about the advertisements that should be inserted into the video stream via the manifest file. The manifest file is then assembled, including a first "accounting" URL for each unique request, and delivered to the requesting client. The client then uses the manifest file to obtain the manifested primary (e.g., video/audio) content. When an advertising break occurs within the primary content, a first advertising-related URL is utilized to notify a network entity that an advertisement is about to be delivered, and presumably viewed by the video rendering client. The video client then requests the video chunks representing the advertisement from the network using the manifest file URLs pertaining to the advertisement.

Unfortunately, a rogue client or surreptitious "bot" can merely perform the aforementioned notification of the network entity one or more times to artificially "trick" the network entity/management system into believing that advertisements are being requested by a valid video client (and presumably being viewed by a human). There is no mechanism to ensure that a requesting "client" requests the entertainment video chunks, or requests all of the video chunks containing the advertisements.

Typically, a principal motivation of the malicious agent in advertisement viewing fraud scenarios is to undermine confidence in the integrity and accounting practices of the distributor, who is paid to distribute the secondary content and associated primary content. This is somewhat similar to "click fraud" scenarios, whereby a "click bot" imitates a legitimate user of a web browser clicking on an ad, thereby generating a charge-per-click without having actual interest in the target of the advertisement's link. However, in click fraud scenarios, the malicious agent is typically a competitor who seeks to beat down the advertiser's website and advertising account. Under any scenario, such malicious activity is highly detrimental and undesirable.

In a related aspect, advertisers (and other content managers or distributers) desire to maintain an accurate accounting of secondary content consumption; e.g., in terms of how much of a given requested secondary content asset was "consumed" by a valid consumer (e.g., website or network user or subscriber, part of target audience, etc.). For example, it is often very telling to an advertiser to know how much of the total runtime of a video and/or audio advertisement was actually rendered for viewing/listening by the consumer; advertisements which (statistically) are only viewed by the target audience for a few seconds before a tune-away or other terminating event occurs may be presumed to be of little interest to that target audience. Existing methods and apparatus for obtaining such data are at best marginally effective, in that they are modeled for prefatory or introductory advertisements for short clips (i.e., at beginning or end of a video segment only), and are generally "binary" in nature (i.e., completed or not completed).

For example, in both managed and unmanaged networks, Internet Protocol (IP) content is typically delivered with embedded secondary content links or elements. For instance, exemplary YouTube™ or similar packetized audio-visual media frequently include an embedded or prefatory advertisement, such as a fifteen-second clip for a product or service. In many cases, the requesting viewer can opt-out of the advertisement (and proceed directly to the requested content element) after a period of time, or by clicking on a graphical control element rendered on the screen (e., a "close window" or "x" box rendered within the viewing window of the content). However, one can only infer so much behavioral motivation or obtain so much useful insight from data indicating only completion, early termination, etc.

Hence, a reliable mechanism for determining "how much" (whether measured temporally, or in terms of other consumption attributes or parameters) of a given advertisement is consumed by a valid user is also needed.

Based on the foregoing, both (i) apparatus and methods for preventing viewership fraud with regards to the distribution of primary content having secondary content inserted therein to a one or more users, and (ii) apparatus and methods for accurately determining a degree or quality of audience consumption of such secondary content, are needed. Ideally, these apparatus and methods would, inter alia, prevent the relevant network infrastructure (e.g., ADS) from counting requests for secondary content unless the secondary content is actually requested by a client, including e.g., a client that is also requesting primary content. Such apparatus and methods would, in addition, also ideally ensure accurate accounting of the consumption of an advertisement or other secondary content element by one or more users.

SUMMARY OF THE DISCLOSURE

The present disclosure provides, inter alia, apparatus and methods for secondary content management and fraud prevention.

In a first aspect, a method of delivering Internet Protocol (IP) packetized media content and advertising content is disclosed. In one embodiment, the delivery is to an IP-enabled client device of a subscriber within a managed content delivery network, and the method includes: authenticating at least one of the subscriber and/or client device to access content via the managed content delivery network; receiving a first communication from the client device for delivery of the IP packetized media content; causing generation of a unique session identifier relating to the first communication; transmitting a manifest file containing the unique session identifier, first information relating to a plurality of media elements, and second information relating to at least one advertising element, to the client device; receiving from the client device another communication, the another communication comprising at least a portion of the second information and the unique session identifier; validating the another communication based at least on the unique session identifier contained therein; causing counting of the validated another communication as a valid advertising request; and causing provision of the at least one advertising element to the client device via an IP transport.

In one variant, the method further includes: receiving a communication containing the unique session identifier and at least a portion of the first information; and causing delivery of at least a portion of the plurality of media elements to the client device via an IP transport.

In one implementation, the receiving the communication containing the unique session identifier and at least a portion of the first information, and the causing delivery of at least a portion of the plurality of media elements to the client device via an IP transport, each occur before the receipt of the another communication; and the receipt of the communication containing the unique session identifier and at least a portion of the first information is a condition precedent for the validating of the another communication.

In another aspect, a method for validating a secondary content request received in a content distribution network is disclosed. In one embodiment, the method includes: receiving a request for provision of secondary content at a secondary content management entity of the content distribution network; examining the request to identify a shared data element present within the request; utilizing information present within the shared data element to validate the secondary content request; and forwarding information to a accounting process enabling the accounting process to count the secondary content request as a valid request.

In one variant, the shared data element comprises an at least periodically unique identifier issued by an entity of the network and transmitted to a valid client of the network for use in a secondary content request, such as e.g., a globally unique identifier (GUID) useful only within the content distribution network.

In another variant, the shared data element comprises a data value previously provided to a particular client device of the content distribution network, the data value having a finite temporal period of validity, and the utilizing the information present in the shared data element to validate the request comprises determining that the request for secondary content including the data value was received by the secondary content management entity within the finite temporal period of validity.

In a further variant, the shared data element comprises a cryptographic hash of a value, the value previously provided to a client of the content distribution network by an entity of the content distribution network; and the utilizing the information present in the shared data element to validate the request comprises: (i) retrieving a copy of the value from local storage within the content distribution network; (ii) utilizing a cryptographic hash algorithm common to both the secondary content management entity and the client, to hash the retrieved copy of the value to generate a local hash; and (iii) comparing the local hash to the cryptographic hash to identify any differences there between.

In another embodiment of the method, the method includes: receiving a first communication from the client device for delivery of the IP packetized media content; causing generation of a unique session identifier relating to the first communication; transmitting a manifest file comprising the unique session identifier, first information relating to a plurality of advertising content elements, and second information relating to the media content, to the client device, the plurality of advertising content elements collectively comprising a complete advertisement; receiving from the client device another communication, the another communication comprising at least: (i) a first portion of the first information, the first portion of the first information relating to a first of the plurality of advertising content elements, and (ii) the unique session identifier; validating the another communication based at least on the unique session identifier contained therein; causing provision of the first of the plurality of advertising content elements to the client device via an IP transport; and receiving from the client device a subsequent communication, the subsequent communication comprising: (i) a second portion of the first information, the second portion of the first information relating to a second of the plurality of advertising content elements, (ii) the unique session identifier, and (iii) a consumption-related value.

In one variant, the consumption-related value is indicative of at least one of a quality or amount of a then-current consumption of the advertisement by the client device.

In another variant, the consumption-related value comprises a value related to an ID3 tag embedded in the second of the plurality of advertising content elements.

In another variant, the consumption-related value comprises a value related to a metadata element embedded in a stream of the second of the plurality of advertising content elements.

In another variant, the another communication further comprises a consumption-related value.

In another aspect of the disclosure, a network apparatus of a content distribution network is provided. In one embodiment, the network apparatus is configured for validating an advertising content request, the advertising content request associated with delivery of packetized media content via an IP (Internet Protocol) transport, and includes: processing apparatus; network interface apparatus in data communication with the processing apparatus and configured to conduct data communications with a plurality of client devices via at least the content distribution network; and storage apparatus in data communication with the processing apparatus and comprising computerized logic executable on the processing apparatus.

In one variant, the computerized logic is configured to, when executed: cause generation of a shared data element for provision to a particular client device; transmit at least the shared data element to the particular client device via the network interface apparatus and the content distribution network; receive a request for provision of advertising content from the particular client device, the request including the shared data element; extract the shared data element present within the request; and utilize at least a portion of the shared data element to validate the advertising content request.

In another variant, the shared data element comprises an identifier which is globally unique at least within the content distribution network for at least a prescribed period of time; the transmission of the shared data element to the particular client device comprises a transmission of a host data structure of which the shared data element is part, the host data structure further comprising data indicating one or more network locations where the packetized media content may be obtained by the particular client device; and the request specifies a universal resource locator (URL) present within the host data structure from which at least a portion of the advertising content can be obtained. The host data structure comprises for example a manifest file comprising (i) one or more URLs corresponding to the one or more locations where the packetized media content may be obtained; and (ii) the URL.

In another variant, the computerized logic is further configured to, when executed, verify that at least a portion of the packetized media content has been previously requested by the particular client device as part of a common session. The common session is identified within the shared data element.

In yet a further variant, the causation of the generation of the shared data element for provision to a particular client device is pursuant to receipt by the network apparatus of a prior request issued by the particular client device to obtain a manifest file relating to the packetized media content.

In a further aspect, a method of delivering Internet Protocol (IP) packetized advertising content to an IP-enabled client device of a user within a content distribution network is disclosed. In one embodiment, the method includes: obtaining a unique identifier; transmitting a data structure comprising at least the unique identifier, and first information relating to a plurality of advertising content elements, to the client device, the plurality of advertising content elements each comprising a portion of a complete advertisement; receiving from the client device a communication, the communication comprising at least: (i) a first portion of the first information, the first portion of the first information relating to a first of the plurality of advertising content elements, and (ii) the unique identifier or a derivative thereof; validating the communication based at least on the unique identifier or derivative of contained therein; causing provision of the first of the plurality of advertising content elements to the client device via an IP transport; and receiving from the client device a subsequent communication, the subsequent communication comprising: (i) a second portion of the first information, the second portion of the first information relating to a second of the plurality of advertising content elements, (ii) the unique identifier or the derivative thereof, and (iii) consumption-related data.

In one variant, the consumption-related data is indicative of at least one of an amount of a then-current consumption of the advertisement by the client device.

In yet another aspect of the disclosure, an IP-enabled client device is provided. In one embodiment, the client device comprises a software component (e.g., middleware or application) configured to receive manifest files with unique identifiers, and issue content requests including one or more of the unique identifiers or derivations thereof.

In yet a further aspect, a method of determining the consumption of a secondary content element is disclosed. In one embodiment, beacons or tags are included within at least portions of an address associated with multi-part secondary content element. Upon transmission of the address by a rendering client, the beacon or tag is extracted from the address, and used to determine how much (e.g., percentage) of the secondary content element has been rendered. In another embodiment, the beacon or tag is embedded within the secondary content element itself, and is extracted upon decode, and sent to the serving device as part of a subsequent communication, so as to assure that decode of the segment has actually occurred, and to indicate progress of the rendering process.

In still another aspect, a method of mitigating or preventing advertising fraud on a content distribution network is disclosed. In one embodiment, the method includes inserting a unique identifier in one or more of a plurality of content segment addresses, such that a requesting client must present the unique identifier (e.g., within a prescribed period of time in one variant) to the serving or managing delivery device before the request is acted upon. In another embodiment, the identifier is embedded within one or more of the content elements ("chunks") themselves, such that the client must decode the content element(s) to obtain the identifier and retrieve the next content element chunk from the network.

These and other aspects of the disclosure shall become apparent when considered in light of the disclosure provided herein.

Figure 1:
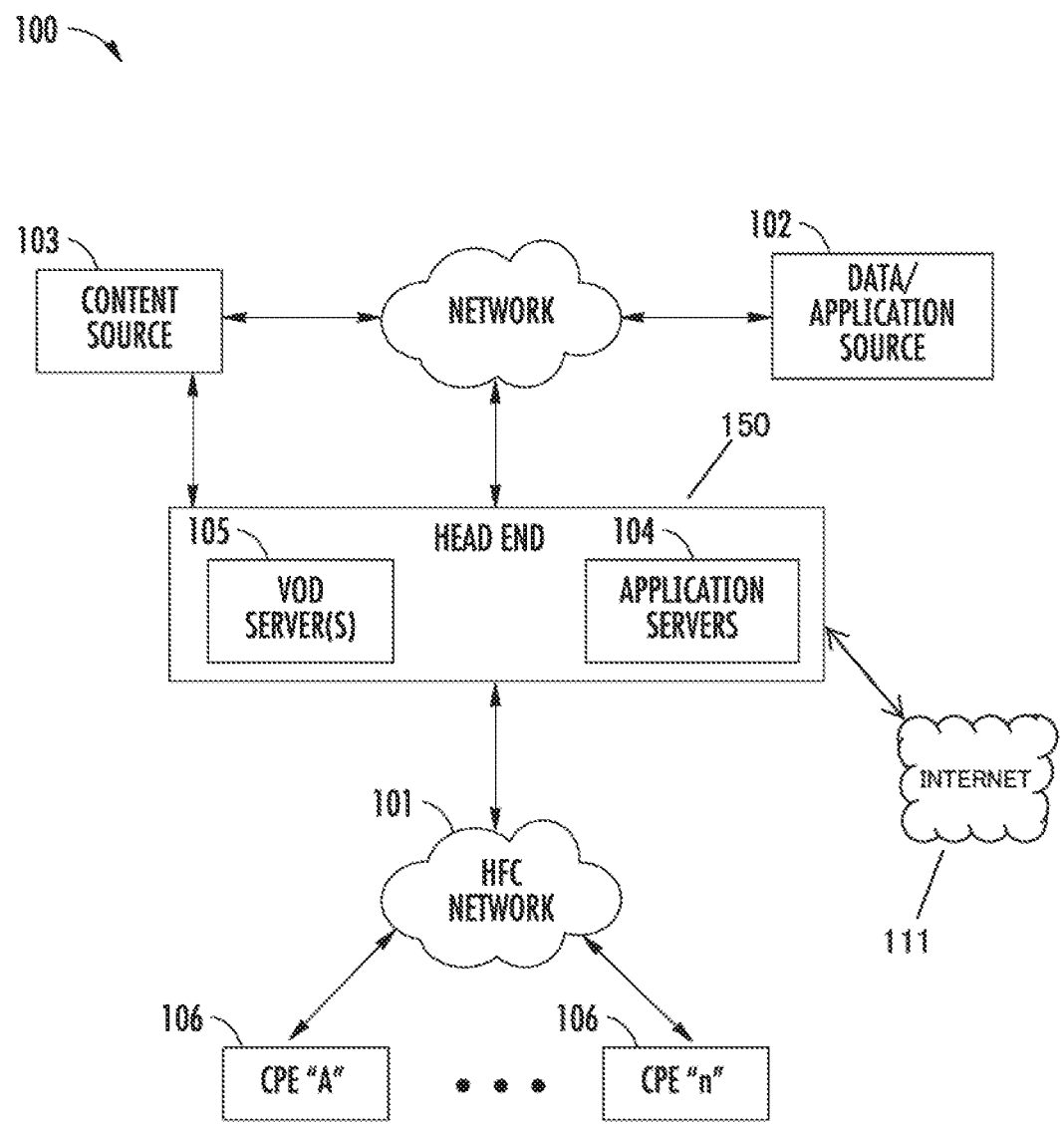
FIG. 1 is a functional block diagram illustrating an exemplary hybrid fiber coax (HFC) cable network configuration useful with various aspects of the present disclosure.

All Figures© Copyright 2015 Time Warner Cable Enterprises, Inc. All rights reserved.

DETAILED DESCRIPTION

Reference is now made to the drawings wherein like numerals refer to like parts throughout.

As used herein, the term "advertisement" and similar forms refers without limitation to any audio, visual, or promotion, message, or communication, whether for-profit or otherwise, that is perceptible by a human. Examples of advertisements include so-called "bumper" advertisements (advertisements inserted before or after a client requested program), "pause" advertisements (presented when a client sends a pause control command to a video server or the like), or additional and replacement advertisements.

As used herein, the term "application" refers generally and without limitation to a unit of executable software that implements a certain functionality or theme. The themes of applications vary broadly across any number of disciplines and functions (such as on-demand content management, Internet browsers, e-commerce transactions, brokerage transactions, home entertainment, calculator etc.), and one application may have more than one theme. The unit of executable software generally runs in a predetermined environment; for example, the unit could comprise a downloadable Java Xlet™ that runs within the JavaTV™ environment.

As used herein the term "browser" refers to any computer program, application or module which provides network access capability including, without limitation, Internet browsers adapted for accessing one or more websites or URLs over the Internet, as well as any "user agent" including those adapted for visual, aural, or tactile communications.

As used herein, the terms "client device" and "end user device" include, but are not limited to, set-top boxes (e.g., DSTBs), "smart" televisions, gateways, modems, personal computers (PCs), and minicomputers, whether desktop, laptop, or otherwise, and mobile devices such as handheld computers, PDAs, personal media devices (PMDs), tablets, and smartphones.

As used herein, the term "codec" refers to an video, audio, or other data coding and/or decoding algorithm, process or apparatus including, without limitation, those of the MPEG (e.g., MPEG-1, MPEG-2, MPEG-4, etc.), Real (Real Video, etc.), AC-3 (audio), DiVX, XViD/ViDX, Windows Media Video (e.g., WMV 7, 8, 9, 10), ATI Video codec, or VC-1 (SMPTE standard 421M) families.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.), Binary Runtime Environment (e.g., BREW), and the like.

As used herein, the term "conditional access" refers to any access control scheme, whether implemented in hardware, software, or firmware (or combinations thereof), including without limitation members of the "Powerkey" family (Powerkey Book 2, Powerkey Book 3, etc.), NDS (including VideoGuard, mVideoGuard, etc.), ANSI/SCTE Standard 52 2003 (DVS-042), incorporated herein by reference in its entirety, and Motorola/General Instrument DigiCipher® family (DigiCipher II, etc.). These can be implemented using, for example, the so-called "CableCard" plug-in security module access technology, a downloadable CA system (DCAS), or otherwise.

The terms "Consumer Premises Equipment (CPE)" and "host device" refer without limitation to any type of electronic equipment located within a consumer's or user's premises and connected to or in communication with a network, and may include client devices or end-user devices. The term "host device" includes terminal devices that have access to digital television content via a satellite, cable, wireless or terrestrial network. The host device functionality may be integrated into a digital television (DTV) set.

As used herein, the term "display" means any type of device adapted to display information, including without limitation CRTs, LCDs, TFTs, plasma displays, LEDs, incandescent and fluorescent devices. Display devices may also include less dynamic devices such as, for example, printers, e-ink devices, and the like.

As used herein, the term "DOCSIS" refers to any of the existing or planned variants of the Data Over Cable Services Interface Specification, including for example DOCSIS versions 1.0, 1.1, 2.0 and 3.0.

As used herein, the term "headend" refers generally to a networked system controlled by an operator (e.g., an MSO or multiple systems operator) that distributes programming to MSO clientele using client devices. Such programming may include literally any information source/receiver including, inter alia, free-to-air TV channels, pay TV channels, interactive TV, and the Internet.

As used herein, the terms "Internet" and "internet" are used interchangeably to refer to inter-networks including, without limitation, the Internet.

As used herein, the term "mass storage" includes any type of integrated circuit or other storage device adapted for storing digital data including, without limitation, ROM. PROM, EEPROM, DRAM, SDRAM, DDR/2 SDRAM, EDO/FPMS, RLDRAM, SRAM, "flash" memory (e.g., NAND/NOR), and PSRAM.

As used herein, the terms "microprocessor" and "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable computer fabrics (RCFs), array processors, secure microprocessors, and application-specific integrated circuits (ASICs). Such digital processors may be contained on a single unitary IC die, or distributed across multiple components.

As used herein, the term "modem" refers to any kind of modulation or demodulation process or apparatus including without limitation cable (e.g., DOCSIS compliant) modems, DSL modems, analog modems, and so forth.

As used herein, the terms "MSO" or "multiple systems operator" refer without limitation to a cable, fiber to the home (FTTH), fiber to the curb (FTTC), satellite, Hybrid Fiber Copper (HFCu), or terrestrial network provider having infrastructure required to deliver services including programming and data over those mediums.

As used herein, the terms "network" and "bearer network" refer generally to any type of telecommunications or data network including, without limitation, hybrid fiber coax (HFC) networks, HFCu networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols.

As used herein, the term "network interface" refers to any signal, data, or software interface with a component, network or process including, without limitation, those of the FireWire (e.g., FW400, FW800, etc.), USB (e.g., USB2), Ethernet (e.g., 10/100, 10/100/1000 (Gigabit Ethernet), 10-Gig-E, etc.), MoCA, Coaxsys (e.g., TVnet™), radio frequency tuner (e.g., in-band or OOB, cable modem, etc.), Wi-Fi (802.11), WiMAX (802.16), PAN (e.g., 802.15), or IrDA families.

As used herein, the term "node" refers to any functional entity associated with a network, such as for example: CPE, edge device, server, gateway, router, Optical Line Terminal (OLT), Optical Network Unit (ONU), etc. whether physically discrete or distributed across multiple locations.

As used herein, the term "server" refers to any computerized component, system or entity regardless of form which is adapted to provide data, files, applications, content, or other services to one or more other devices or entities on a computer network.

As used herein, the term "user interface" refers to, without limitation, any visual, graphical, tactile, audible, sensory, or other means of providing information to and/or receiving information from a user or other entity. A user interface may comprise, for example, a computer screen display, touch screen, speech recognition engine, text-to-speech (TTS) algorithm, and so forth.

As used herein, the term "Wi-Fi" refers to, without limitation, any of the variants of IEEE-Std. 802.11 or related standards including e.g., 802.11 a/b/g/n/v/ac.

As used herein, the term "wireless" means any wireless signal, data, communication, or other interface including without limitation Wi-Fi, Bluetooth, 3G (3GPP/3GPP2), HSDPA/HSUPA, TDMA, CDMA (e.g., IS-95A, WCDMA, etc.), FHSS, DSSS, GSM, PAN/802.15, WiMAX (802.16), 802.20, narrowband/FDMA, OFDM, PCS/DCS, LTE/LTE-A, analog cellular, CDPD, satellite systems, mesh networks, millimeter wave or microwave systems, acoustic, and infrared (i.e., IrDA).

Overview

In one exemplary aspect, the present disclosure provides apparatus and methods for preventing or mitigating surreptitious activities such as advertising fraud. In one embodiment described herein, a managed content distribution network (e.g., cable television network) is configured to prevent extant video advertising accounting systems from "counting" requests for advertisements or other secondary content elements unless the advertisement/content element is truly requested by a valid video client (e.g., end user or subscriber device). In one implementation, this is accomplished using a session-specific data which is embedded within e.g., the manifest file delivered to the client. The session-specific data is then transmitted by the requesting client along with its request for advertisement or other assets to the relevant network entity, and the network entity evaluates the transmitted session-specific data to determine whether it meets certain validation criteria before marking the request as "valid" and enabling it to be counted.

Moreover, in another embodiment, the network is configured to further determine that the ostensibly valid requesting client is also validly requesting video assets or other primary content along with the advertisement(s), thereby providing further assurance of the authenticity of the advertisement request.

Using the foregoing techniques, malicious agents such as "bots" are frustrated from tricking the relevant network infrastructure into counting advertisements that are never actually consumed.

In another exemplary aspect, the present disclosure provides apparatus and methods of measuring actual consumption of secondary content (such as advertisements) by valid content consumers. In one embodiment, "beacons" or other such data are introduced into the video advertisement or other secondary content element that can be used to determine, for instance, how much of the advertisement has been delivered. In one implementation, the video player client uses the advertisement accounting URL delivered in the manifest and associated with the advertisement to send the relevant network entity (e.g., ADS) one or more message with information relating to one or more consumption attributes (e.g., for each portion successfully rendered), along with the session-specific data associated with the rendering session.

Detailed Description of Exemplary Embodiments

Exemplary embodiments of the apparatus and methods of the present disclosure are now described in detail. While these exemplary embodiments are described primarily in the context of mentioned managed hybrid fiber coax (HFC) cable architecture having a multiple systems operator (MSO), digital networking capability, IP delivery capability (including e.g., IP-packetized delivery via CMTS/DOCSIS, and/or so called "in band" delivery of IP content such as via an MPEG transport stream carrying IP-packetized content), and a plurality of client devices/CPE, the general principles and advantages of the disclosure may be extended to other types of networks and architectures that are configured to deliver digital media data (e.g., text, video, and/or audio, discrete content elements such as files, executables, etc.). Such other networks or architectures may be broadband, narrowband, wired or wireless, managed or unmanaged, hybridized between two or more topologies or delivery modalities, or otherwise.

It will also be appreciated that while described generally in the context of a network providing service to a customer or consumer (i.e., residential) end user domain, the present disclosure may be readily adapted to other types of environments including, e.g., commercial/enterprise, and government/military applications. Myriad other applications are possible.

Also, while certain aspects are described primarily in the context of the well-known Internet Protocol (described in, inter alia, *Internet Protocol DARPA Internet Program Protocol Specification*, IETF RCF 791 (September 1981) and Deering, et al., *Internet Protocol, Version 6 (IPv6) Specification*, IETF RFC 2460 (December 1998) each of which is incorporated herein by reference in its entirety), it will be appreciated that the present disclosure may utilize other types of protocols (and in fact bearer networks to include other internets and intranets) to implement the described functionality.

Other features and advantages of the present disclosure will immediately be recognized by persons of ordinary skill in the art with reference to the attached drawings and detailed description of exemplary embodiments as given below.

Bearer Network—

FIG. 1 illustrates a typical managed content delivery network configuration. The various components of the network 100 include (i) one or more data and application origination points 102; (ii) one or more content sources 103, (iii) one or more application distribution servers 104; (iv) one or more Video-On-Demand (VOD) servers 105, and (v) customer premises equipment (CPE) 106. The distribution server(s) 104, VOD servers 105 and CPE(s) 106 are connected via a bearer (e.g., HFC) network 101. A simple architecture comprising one of each of the aforementioned components 102, 104, 105, 106 is shown in FIG. 1 for simplicity, although it will be recognized that comparable architectures with multiple origination points, distribution servers, VOD servers, and/or CPE devices (as well as different network topologies) may be utilized consistent with the present disclosure. For example, the headend architecture of FIG. 1a (described in greater detail below), or others, may be used.

The data/application origination point 102 comprises any medium that allows data and/or applications (such as a VOD-based or "Watch TV" application) to be transferred to a distribution server 104. This may include for example a third party data source, application vendor website, CD-ROM, external network interface, mass storage device (e.g., RAID system), etc. Such transference may be automatic, initiated upon the occurrence of one or more specified events (such as the receipt of a request packet or ACK), performed manually, or accomplished in any number of other modes readily recognized by those of ordinary skill. The application distribution server 104 comprises a computer system where such applications enter the network system. Distribution servers are well known in the networking arts, and accordingly not described further herein.

The VOD server 105 comprises a computer system where on-demand content is received from one or more of the aforementioned data sources 102 and enter the network system. These servers may generate the content locally, or alternatively act as a gateway or intermediary from a distant source.

The VOD server 105 and application distribution servers 104 are a part of the headend architecture of the network 100. The headend 150 is connected to an internetwork (e.g., the Internet) 111.

Figure 1A:
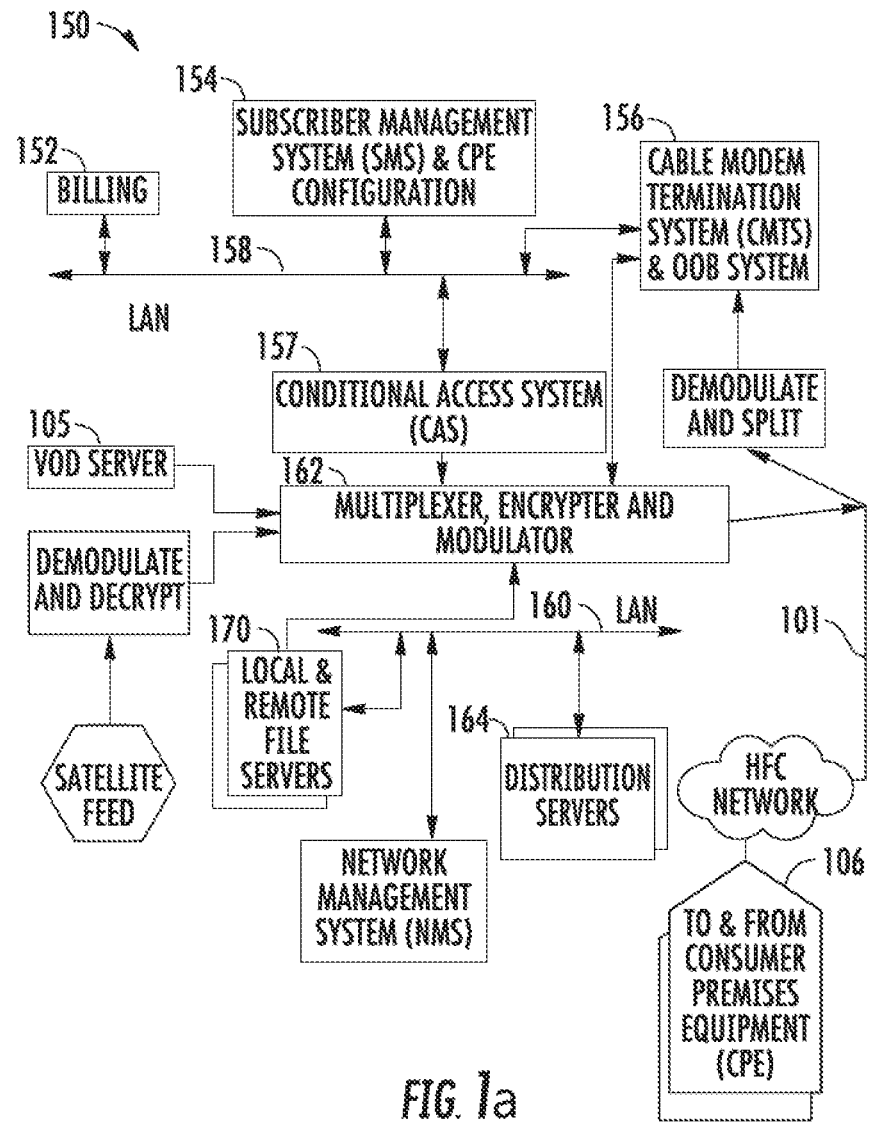
FIG. 1a is a functional block diagram illustrating one exemplary HFC cable network headend configuration useful with various aspects of the present disclosure.

Referring now to FIG. 1a, one exemplary embodiment of a headend architecture is described. As shown in FIG. 1a, the headend architecture 150 comprises typical headend components and services including billing module 152, subscriber management system (SMS) and CPE configuration management module 154, cable-modem termination system (CMTS) and OOB system 156, as well as LAN(s) 158, 160 placing the various components in data communication with one another. It will be appreciated that while a bar or bus LAN topology is illustrated, any number of other arrangements as previously referenced (e.g., ring, star, etc.) may be used consistent with the disclosure. It will also be appreciated that the headend configuration depicted in FIG. 1a is high-level, conceptual architecture, and that each MSO may have multiple headends deployed using custom architectures.

Figure 1B:
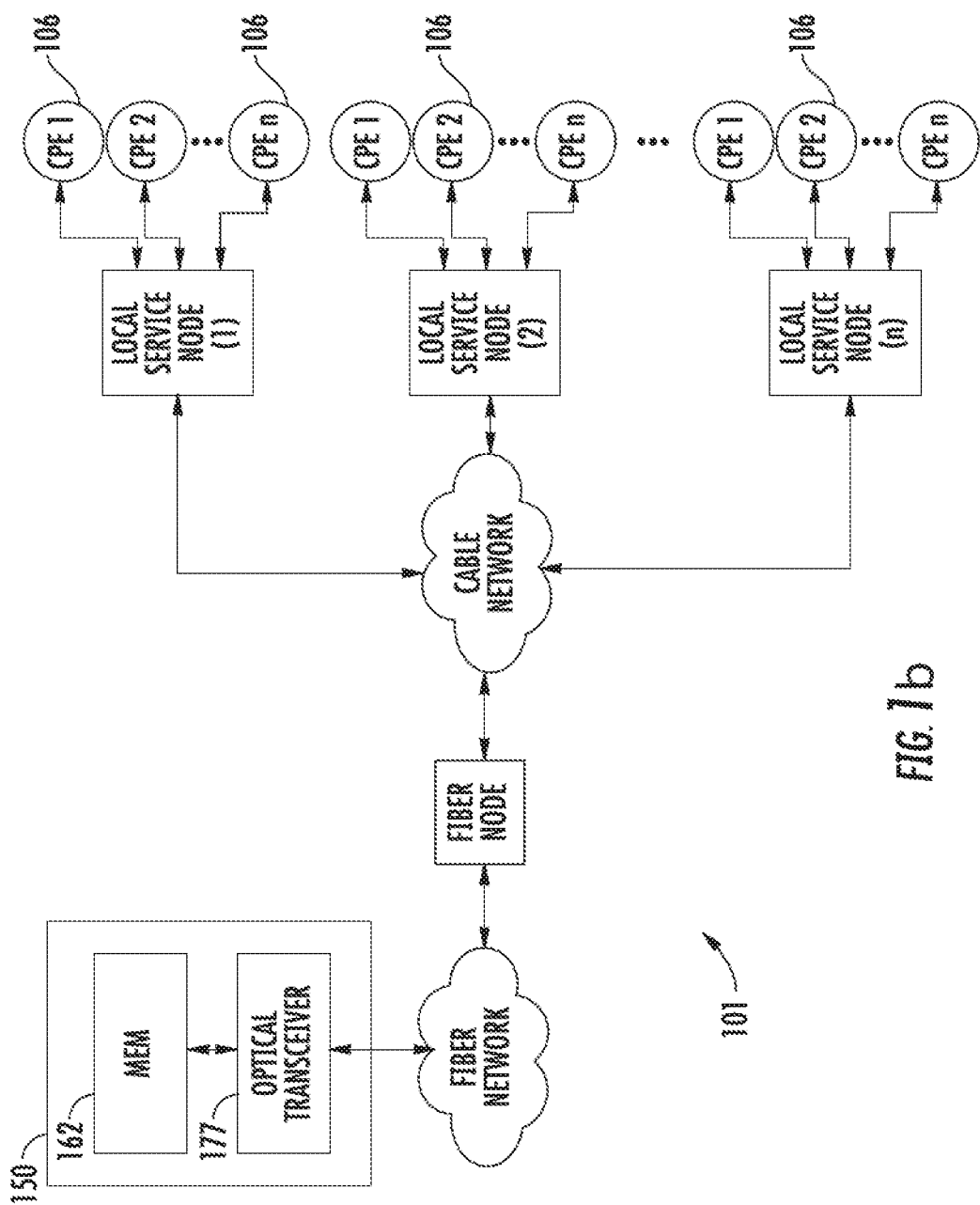
FIG. 1b is a functional block diagram illustrating one exemplary embodiment of a local service node configuration useful with various aspects of the present disclosure.

The exemplary architecture 150 of FIG. 1a further includes a conditional access system (CAS) 157 and a multiplexer-encrypter-modulator (MEM) 162 coupled to the HFC network 101 adapted to process or condition content for transmission over the network. The distribution servers 164 are coupled to the LAN 160, which provides access to the MEM 162 and network 101 via one or more file servers 170. The VOD servers 105 are coupled to the LAN 160 as well, although other architectures may be employed (such as for example where the VOD servers are associated with a core switching device such as an 802.3z Gigabit Ethernet device). As previously described, information is carried across multiple channels. Thus, the headend must be adapted to acquire the information for the carried channels from various sources. Typically, the channels being delivered from the headend 150 to the CPE 106 ("downstream") are multiplexed together in the headend, as previously described and sent to neighborhood hubs (FIG. 1*b*) via a variety of interposed network components.

Content (e.g., audio, video, data, files, etc.) is provided in each downstream (in-band) channel associated with the relevant service group. To communicate with the headend or intermediary node (e.g., hub server), the CPE 106 may use the out-of-band (OOB) or DOCSIS channels and associated protocols. The OCAP 1.0, 2.0, 3.0 (and subsequent) specification provides for exemplary networking protocols both downstream and upstream, although the present disclosure is in no way limited to these approaches.

"Switched" Networks—

Figure 1C:
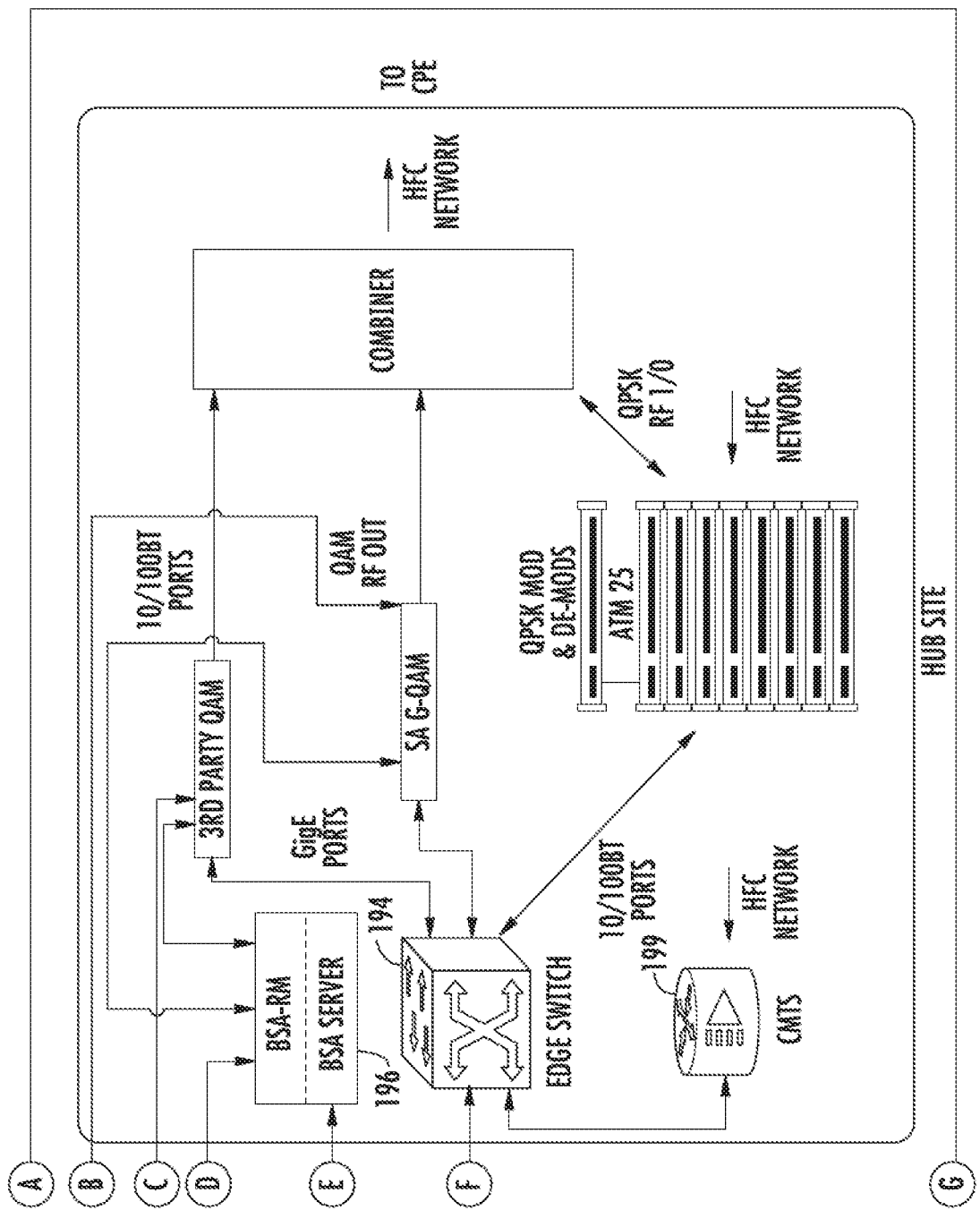
FIG. 1c is a functional block diagram illustrating one exemplary embodiment of a broadcast switched architecture (BSA) useful with various aspects of the present disclosure.

FIG. 1*c* illustrates an exemplary "switched" network architecture. Switching architectures allow improved efficiency of bandwidth use for ordinary digital broadcast programs. Ideally, the subscriber is unaware of any difference between programs delivered using a switched network and ordinary streaming broadcast delivery.

FIG. 1*c* shows the implementation details of one exemplary embodiment of this broadcast switched network architecture. Specifically, the headend 150 contains switched broadcast control 190 and media path functions 192; these element cooperating to control and feed, respectively, downstream or edge switching devices 194 at the hub site which are used to selectively switch broadcast streams to various service groups. BSA media path 192 may include a staging processor 195, source programs, and bulk encryption in communication with a switch 275. A BSA server 196 is also disposed at the hub site, and implements functions related to switching and bandwidth conservation (in conjunction with a management entity 198 disposed at the headend). An optical transport ring 197 is utilized to distribute the dense wave-division multiplexed (DWDM) optical signals to each hub in an efficient fashion.

In addition to "broadcast" content (e.g., video programming), the systems of FIGS. 1*a* and 1*c* (and 1*d* discussed below) also deliver Internet data or video services using the Internet protocol (IP), although other protocols and transport mechanisms of the type well known in the digital communication art may be substituted. One exemplary delivery paradigm comprises delivering MPEG-based video content, with the video transported to user PCs (or IP-based STBs) over the aforementioned DOC SIS channels comprising MPEG (or other video codec such as H.264 or AVC) over IP over MPEG. That is, the higher layer MPEG- or other encoded content is encapsulated using an IP protocol, which then utilizes an MPEG packetization of the type well known in the art for delivery over the RF channels. In this fashion, a parallel delivery mode to the normal broadcast delivery exists; i.e., delivery of video content both over traditional downstream QAMs to the tuner of the user's STB or other receiver device for viewing on the television, and also as packetized IP data over the DOCSIS QAMs to the user's PC or other IP-enabled device via the user's cable modem. Delivery in such packetized modes may be unicast, multicast, or broadcast.

Referring again to FIG. 1*c*, the IP packets associated with Internet services are received by edge switch 194, and in one embodiment forwarded to the cable modem termination system (CMTS) 199. The CMTS examines the packets, and forwards packets intended for the local network to the edge switch 194. Other packets are discarded or routed to another component. The edge switch 194 forwards the packets receive from the CMTS 199 to the QAM modulator 189, which transmits the packets on one or more physical (QAM-modulated RF) channels to the CPE. The IP packets are typically transmitted on RF channels (e.g., DOCSIS QAMs) that are different that the RF channels used for the broadcast video and audio programming, although this is not a requirement. The CPE 106 are each configured to monitor the particular assigned RF channel (such as via a port or socket ID/address, or other such mechanism) for IP packets intended for the subscriber premises/address that they serve.

"Packet-Optimized Networks"—

Figure 1D:
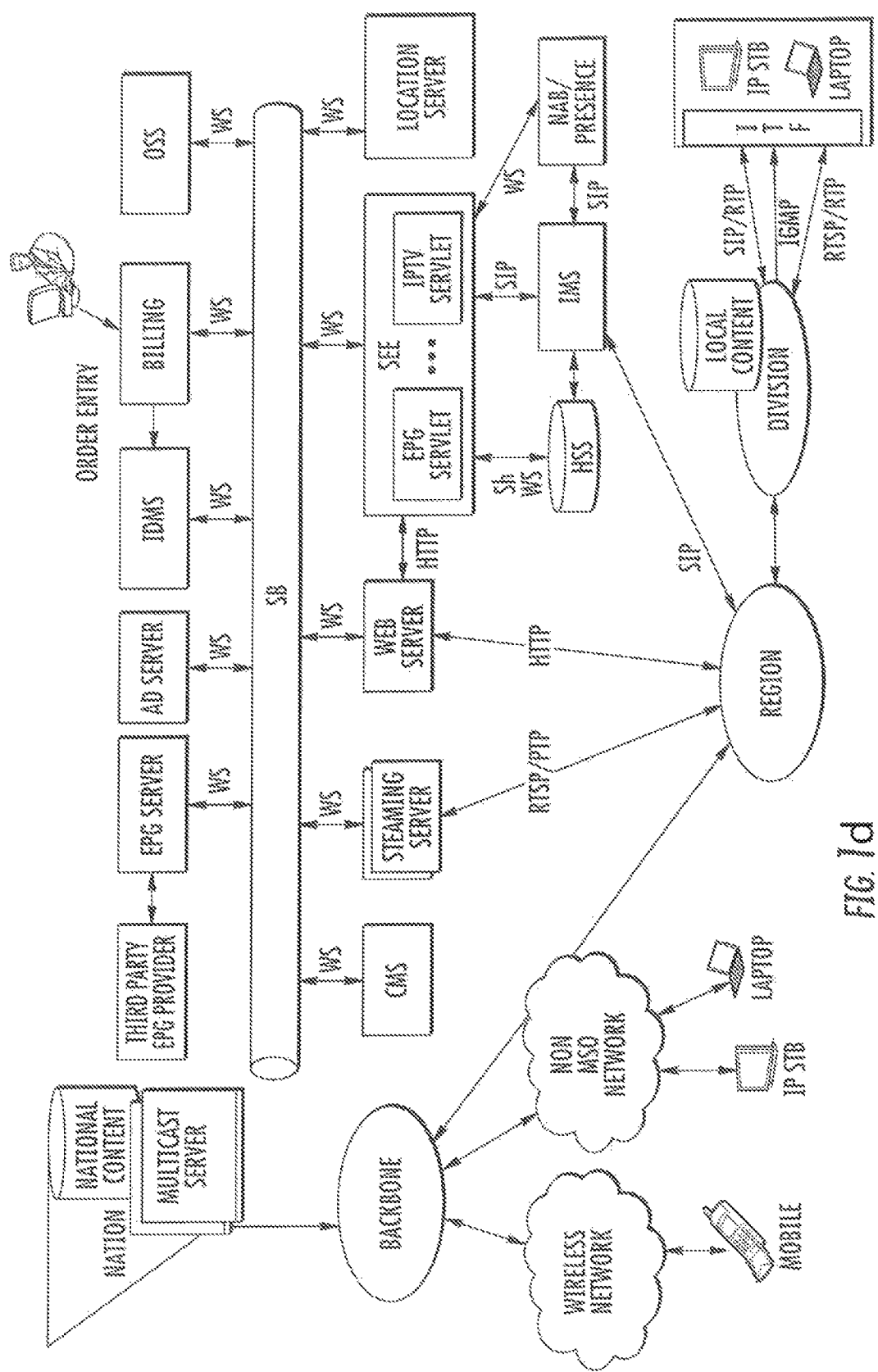
FIG. 1d is a functional block diagram illustrating one exemplary embodiment of a packetized content delivery network architecture useful with the present disclosure.

While the foregoing network architectures described herein can (and in fact do) carry packetized content (e.g., IP over MPEG for high-speed data or Internet TV, MPEG2 packet content over QAM for MPTS, etc.), they are often not optimized for such delivery. Hence, in accordance with another embodiment of the disclosure, a "packet optimized" delivery network is used for carriage of the packet content (e.g., IPTV content). FIG. 1*d* illustrates one exemplary implementation of such a network, in the context of a 3GPP IMS (IP Multimedia Subsystem) network with common control plane and service delivery platform (SDP), as described in co-pending U.S. Provisional Patent Application Ser. No. 61/256,903 filed Oct. 30, 2009 and entitled "METHODS AND APPARATUS FOR PACKETIZED CONTENT DELIVERY OVER A CONTENT DELIVERY NETWORK", which is now published as U.S. Patent Application Publication No. 2011/0103374 of the same title filed on Apr. 21, 2010, each of which is incorporated herein by reference in its entirety. Such a network provides, inter alia, significant enhancements in terms of common control of different services, implementation and management of content delivery sessions according to unicast or multicast models, etc.; however, it is appreciated that the various features of the present disclosure are in no way limited to this or any of the other foregoing architectures.

Figure 1E:
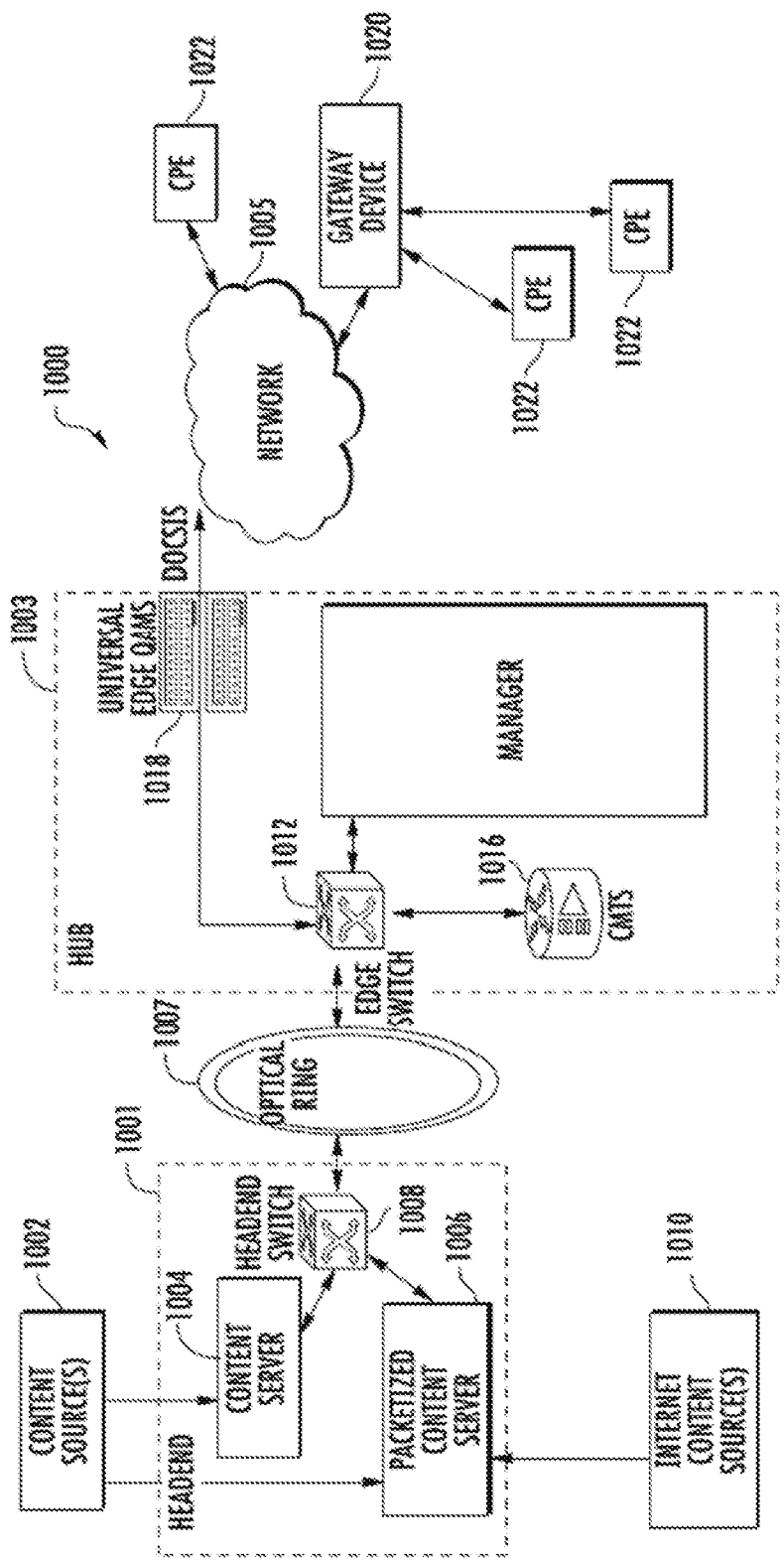
FIG. 1e is a functional block diagram illustrating a second exemplary packetized content delivery network architecture useful with various aspects of the present disclosure.

FIG. 1*e* shows another exemplary network architecture optimized for the delivery of packetized content disclosure useful with the present disclosure. In addition to on-demand and broadcast content (e.g., video programming), the system of FIG. 1*e* may deliver Internet data services using the e.g., Internet protocol (IP).

The network 1000 generally comprises a local headend 1001 in communication with at least one hub 1003 via an optical ring 1007. The distribution hub 1003 is able to provide content to various user devices, CPE 1022, and gateway devices 1020, via a network 1005.

Various content sources 1002 are used to provide content to a content server 1004. For example, content may be received from a local, regional, or network content library as discussed in co-owned co-pending U.S. application Ser. No. 12/841,906 filed on Jul. 22, 2010 and entitled "APPARATUS AND METHODS FOR PACKETIZED CONTENT DELIVERY OVER A BANDWIDTH-EFFICIENT NETWORK", which is incorporated herein by reference in its entirety. Alternatively, content may be received from linear analog or digital feeds, as well as third party content sources. Internet content sources 1010 (such as e.g., a web server) provide Internet content to a packetized content server 1006. Other IP content may also be received at the packetized content server 1006, such as voice over IP (VoIP) and/or IPTV content. Content may also be received from subscriber and non-subscriber devices (e.g., a PC or smartphone-originated user made video). In one embodiment, the functionality of both the content server 1004 and packetized content server 1006 may be integrated into a single server entity.

A central media server located in the headend 1001 may be used as an installed backup to the hub media servers as (i) the primary source for lower demand services, and (ii) as the source of the real time, centrally encoded programs with PVR (personal video recorder) capabilities. By distributing the servers to the hub stations 1003 as shown in FIG. 1e, the size of the fiber transport network associated with delivering VOD services from the central headend media server is advantageously reduced. Hence, each user has access to several server ports located on at least two servers. Multiple paths and channels are available for content and data distribution to each user, assuring high system reliability and enhanced asset availability. Substantial cost benefits are derived from the reduced need for a large content distribution network, and the reduced storage capacity requirements for hub servers (by virtue of the hub servers having to store and distribute less content).

It will also be recognized that a heterogeneous or mixed server approach may be utilized consistent with the disclosure. For example, one server configuration or architecture may be used for servicing cable, satellite, HFCu, etc. subscriber CPE-based session requests, while a different configuration or architecture may be used for servicing mobile client requests. Similarly, the content servers 1004, 1006 may either be single-purpose/dedicated (e.g., where a given server is dedicated only to servicing certain types of requests), or alternatively multi-purpose (e.g., where a given server is capable of servicing requests from different sources).

The network 1000 of FIG. 1e may further include a legacy multiplexer/encrypter/modulator (MEM; not shown) coupled to the network 1005 adapted to "condition" content for transmission over the network. In the present context, the content server 1004 and packetized content server 1006 may be coupled to the aforementioned LAN, thereby providing access to the MEM and network 1005 via one or more file servers (not shown). The content server 1004 and packetized content server 1006 are coupled via the LAN to a headend switching device 1008 such as an 802.3z Gigabit Ethernet (or incipient "10G") device. Video and audio content is multiplexed at the headend 1001 and transmitted to the edge switch device 1012 (which may also comprise an 802.3z Gigabit Ethernet device).

Individual CPEs 1022 of the implementation of FIG. 1e may be configured to monitor the particular assigned RF channel (such as via a port or socket ID/address, or other such mechanism) for IP packets intended for the subscriber premises/address that they serve.

In the switched digital variant, the IP packets associated with Internet services are received by edge switch, and forwarded to the cable modem termination system (CMTS) 1016. The CMTS examines the packets, and forwards packets intended for the local network to the edge switch. Other packets are in one variant discarded or routed to another component.

The edge switch forwards the packets receive from the CMTS to the QAM modulator, which transmits the packets on one or more physical (QAM-modulated RF) channels to the CPE. The IP packets are typically transmitted on RF channels that are different than the RF channels used for the broadcast video and audio programming, although this is not a requirement. As noted above, the CPE are each configured to monitor the particular assigned RF channel (such as via a port or socket ID/address, or other such mechanism) for IP packets intended for the sub scriber premises/address that they serve.

In one embodiment, both IP data content and IP-packetized audio/video content is delivered to a user via one or more universal edge QAM devices 1018. According to this embodiment, all of the content is delivered on DOCSIS channels, which are received by a premises gateway 1020 (described subsequently herein) and distributed to one or more CPE 1022 in communication therewith. Alternatively, the CPE 1022 may be configured to receive IP content directly without need of the gateway or other intermediary. As a complementary or back-up mechanism, audio/video content may also be provided in downstream (in-band) channels as discussed above; i.e., via traditional "video" in-band QAMs. In this fashion, a co-enabled digital set top box (DSTB) or other CPE could readily tune to the new (in-band) RF video QAM in the event that their IP session over the DOCSIS QAM is for some reason interrupted. This may even be accomplished via appropriate logic within the CPE (e.g., autonomously, or based on signaling received from the headend or other upstream entity, or even at direction of a user in the premises; e.g., by selecting an appropriate DSTB or other CPE function).

In the embodiment illustrated in FIG. 1e, IP packetized content is provided to various user devices via the network 1005. For example, content may be delivered to a gateway apparatus 1020 which distributes content received thereat to one or more CPE 1022 in communication with the apparatus 1020.

In another variant, IP simulcast content and existing on-demand, voice, and broadcast content are all provided to the headend switch device 1008 of FIG. 1e. The headend switch 1008 then provides the content to the optical ring 1007 for provision to one or more distribution hubs 1003. IP simulcast content is in one exemplary implementation retrieved from a plurality of content sources at an IPTV server.

The IP-packet content is transmitted to subscriber devices via the universal edge QAM 1018 and the edge network 1005. The IP video ("simulcast") content is presented to client devices capable of receiving content over the DOCSIS QAMs. For example, the aforementioned gateway device 1020 (as well as an advanced CPE 1022 such as an IP-enabled DSTB may receive the IP simulcast. Legacy CPE may receive content via the gateway device 1020, or via an audio/video "back-up" MPEG transport stream as previously described.

In the illustrated embodiment, the gateway device 1020 serves as a gateway to the IP content for other client devices (such as other CPE 1022 and PMD). The gateway device 1020 may communicate with one or more connected CPE 1022, as well as utilize Wi-Fi capabilities (where so equipped) to communicate wirelessly to other devices. It will also be recognized that the present disclosure may be configured with one or more short-range wireless links such as Bluetooth for lower bandwidth applications (or PAN for greater bandwidth applications).

It is still further appreciated that the delivery of content may include delivery from an "off-net" distribution hub (not shown) to another network (not shown), not associated with the MSO. In this embodiment, a requesting device (such as CPE 1022 or gateway 1020, or user mobile device) may request content from a local headend 1001 which is transferred over both MSO-maintained ("on-net") and "off-net" networks, such as an interposed Wi-Fi access point (AP)

with non-MSO broadband connection to the Internet, such as a Telco FiOS, 4G LTE modem, or the like (and via which the serving MSO server at e.g., the headend 1001 delivers content).

Exemplary Secondary Content Management Architecture—

Figure 2:
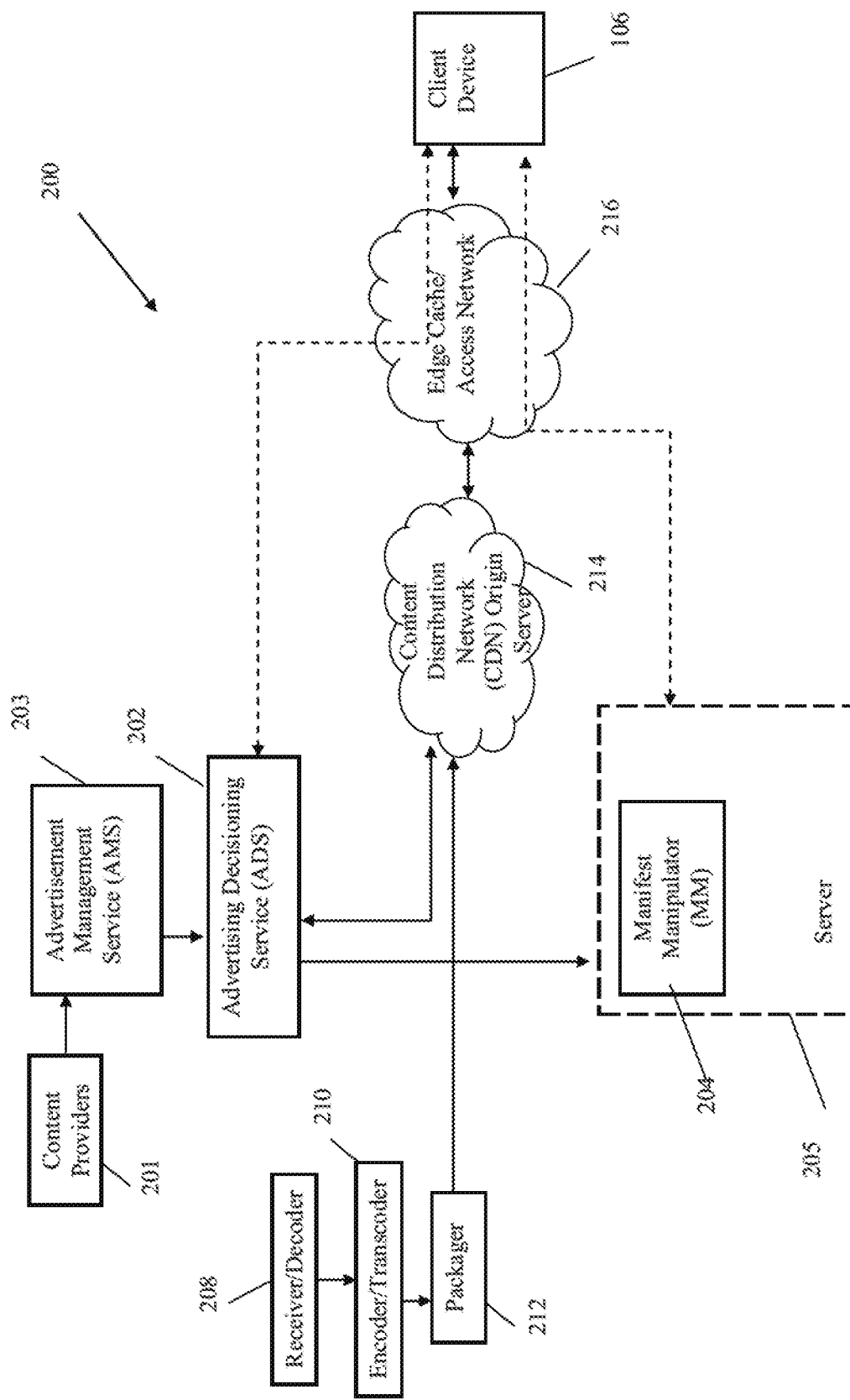
FIG. 2 is a functional block diagram of an exemplary secondary content management architecture, in accordance with various aspects of the present disclosure.

Referring now to FIG. 2, an exemplary embodiment of a secondary content management architecture 200 specifically implementing the various aspects of the disclosure is shown and described. It will be appreciated that the architecture 200 of FIG. 2 can be used in conjunction with any of the foregoing network content distribution architectures (i.e., those of FIGS. 1-1e discussed supra), or can form the basis of its own distribution and delivery architecture.

Additionally, the architectures and systems discussed in co-owned and co-pending U.S. patent application Ser. No. 13/403,802 filed on Feb. 23, 2012 and entitled "APPARATUS AND METHODS FOR PROVIDING CONTENT TO AN IP-ENABLED DEVICE IN A CONTENT DISTRIBUTION NETWORK", which is incorporated herein by reference in its entirety, may be utilized in conjunction with the present disclosure as well.

As shown in FIG. 2, the exemplary management architecture 200 generally comprises an Advertisement Management Service (AMS) 203, which is configured to select individual ones of a plurality of secondary content (e.g., advertisements, promotions or "info-mercials", commercials, telescoping information/advertisements, and short segments) for delivery to individual ones of the client 106 from an secondary content store (not shown). The AMS 203 may, in one embodiment, comprise a server or other computerized device and may be adapted to comply with the requirements set forth in the Society of Cable Telecommunications Engineers SCTE 130-1 and SCTE 130-3 Digital Program Insertion—Advertising Systems Interfaces standards, and/or IAB (Interactive Advertising Bureau) standards and practices, including e.g., those set forth in "Traffic Fraud: Best Practices for Reducing Risk to Exposure", updated May 2015; "OpenRTB Dynamic Native Ads API—Specification Version 1" dated February 2015; "OpenDirect API Specification Version 1.0", finalized January 2015; "Digital Video In-Stream Ad Format Guidelines" released Jan. 8, 2016; "RTB Project OpenRTB API Specification Version 2.4" (Final Draft) dated March 2016; and "RTB Project OpenRTB Dynamic Native Ads API, Specification Version 1.1" dated March 2016, each of the foregoing incorporated herein by reference in its entirety. In one embodiment, the AMS 203 is in communication with an Advertisement Decisioning Service (ADS) 202, the ADS comprising another computerized network entity which is adapted to determine individual ones of the plurality of secondary content from the content store (not shown) to be inserted into the primary content and delivered to the client 106, based on e.g., selection applications or algorithms running on the ADS.

A receiver/decoder entity 208 of the network 200 receives content (e.g., audio, video, data, files, etc.) which is then encoded at the encoder/transcoder 210 to an appropriate format (codec, bitrate, etc.) for the requesting device 106. In one implementation, video is transcoded from a mezzanine quality down to e.g., MPEG-4. The encoder/transcoder 210 may also be used to transcode the content to MP4 in MPEG-2 transport stream (TS) format in a non-rate adaptive manner. The non-rate adaptive format may be used in this case because the stream has a constant bit rate (CBR) at this stage. Utilization of the MPEG-2 TS container enables the MP4 or other content to be multicast to a plurality of devices on the network. Additionally, the MPEG-2 TS content may be delivered with advertisement or other "secondary" content inserted therein via one or more intermediary advertisement insertion mechanisms (not shown). Exemplary apparatus and methods for selection of secondary content to be inserted (e.g., via a "targeted" approach) are described in co-owned and co-pending U.S. patent application Ser. No. 11/186,452 filed on Jul. 20, 2005 and entitled "METHOD AND APPARATUS FOR BOUNDARY-BASED NETWORK OPERATION", U.S. patent application Ser. No. 12/284,757 filed on Sep. 24, 2008 and entitled "METHODS AND APPARATUS FOR USER-BASED TARGETED CONTENT DELIVERY", and U.S. patent application Ser. No. 12/766,433 filed on Apr. 23, 2010 and entitled "APPARATUS AND METHODS FOR DYNAMIC SECONDARY CONTENT AND DATA INSERTION AND DELIVERY", each of which is incorporated herein by reference in its entirety, although other approaches may be used consistent with the present disclosure.

In one embodiment (see discussion of FIG. 3 infra), the architecture 200 of FIG. 2 is configured to generate a unique identifier (e.g., session ID, such as a globally unique ID or GUID, or identifier which is unique for each particular client device or process) for inclusion with a manifest file relating to delivery of primary content (e.g., video assets) requested by the user. As detailed subsequently herein, this approach allows the architecture (including AMS via ADS) to prevent false "counts" for secondary content (e.g., advertisements) which are associated with the primary content assets, such as might be instigated by a "bot" or other malicious entity.

In one exemplary implementation of the foregoing architecture, one or more "beacons" or indicators (including, without limitation, advertisement tags, web beacons, and metadata or data containers) are also embedded into e.g., the metadata of the secondary content, the secondary content itself, or associated with the URLs of the secondary content (as described in greater detail below). In one embodiment, the one or more beacons or indicators may comprise quartile beacons, indicating that 25%, 50%, and 75% (and 100% if desired) of the individual one of the secondary content has been "consumed" by the client device that is rendering the content. It will be appreciated that the term "consumed" as used in the present context may have various definitions, including without limitation: (i) receipt of a valid consumption request at the AMS; (ii) receipt of a data indicative of an actual decode of the relevant chunk(s), or (iii) receipt of data indicative of extraction of the beacon/indicator from e.g., the metadata of a received content chunk (without knowledge of actual decode by the client). In one implementation, the one or more beacons may comprise ID3 tags, such as for example as those adapted to comply with the requirements set forth in ID3 tag version 2.3.0 (see e.g., http//id3.org/id3v2.3.0), which is incorporated herein by reference in its entirety. Alternatively, another mechanism to carry or entrain metadata within an ABR streaming protocol can be used, such as without limitation an encoder-agnostic approach such as MPEG-DASH (aka Dynamic Adaptive Streaming over HTTP); see e.g., ISO/IEC Std. 23009-1: 2012 published April, 2012, and incorporated herein by reference in its entirety. The embedding functions are performed by, in one embodiment, the encoder/transcoder 210, although depending on the scheme used, such "embedding" may be performed by other entities (such as where the tag or indicator is part of e.g., a URL or other data element other than the encoded content).

The encoded content is passed from the encoder 210 to the packager 212, where various service variants are generated and distributed to an origin server 214. The service variants created by the packager 212 correspond to the various services identified by the content providers 201. Thus, each service variant is, in the illustrated embodiment, provided a different playlist (or manifest) containing one or more triggers or markers for varying content based on various considerations. In addition, certain service variants may have triggers embedded in the manifest which other variants may not have.

In on embodiment, the triggers or markers contained in the primary content mark an event that is of interest. In an exemplary embodiment, the events of interest are secondary content (e.g., advertisement) insertion events. That is to say, the primary content is segmented at least at advertisement insertion breaks. The segmenting functions may be performed by, in one embodiment, a staging processor (not shown). Triggering functions may occur using e.g., in-band signaling. In one embodiment, the trigger comprises an Society of Cable Telecommunication Engineers (SCTE)-35 trigger of the type known in the art. Specifically, an SCTE-35 trigger is a cue message embedded in the transport stream which indicates an insertion event which is used to, inter alia, indicate advertisement insertion points (see e.g., SCTE Standards Document ANSI/SCTE 118-2 2007 entitled "*Program-Specific Ad Insertion—Content Provider to Traffic Communication Applications Data Model*", which is incorporated herein by reference in its entirety). In the exemplary embodiment of the present disclosure, the SCTE-35 cue is maintained within the manifest or playlist; it will be appreciated that traditional SCTE-35 cues may be used in addition to those used for embedding beacons or indicators into advertisements as described elsewhere herein. In one exemplary implementation, the SCTE-35 cues are transported in a binary structure in a MPEG-2 transport stream, and are converted to a ASCII- or XML-based structure and embedded in the manifest file which later can trigger the secondary content (e.g., advertisement) insertion.

Still further, the packager may use a Placement Opportunity Interface Specification (POIS) as described by SCTE Standards Document ANSI/SCTE 130-1 200 entitled "Digital Program Insertion—Advertising Systems Interfaces", which is incorporated herein by reference in its entirety, to signal to the alternate event service of alternate event notifications signaled via SCTE-35 triggers.

When primary content is requested by the client 106, the request is serviced via the edge cache 216 which receives content from the origin server 214. Primary content may be stored at the edge 216 in order to facilitate delivery thereof with less latency than content delivered from the origin server 214 (or even deeper towards the core of the network). A content request from a client device 106 to the edge cache 216 in one implementation contains at least the headend ID (or other identifier) assigned to the device 106 by an authorization server (not shown). Alternatively, the MAC address or other device/user-specific identifier (e.g., IP address) or URL which is associated with a known or determinable location may be utilized. Yet further, location-specific coordinates such as e.g., GPS/A-GPS—generated lat./lon., zip code, or other geolocation data may be used to identify one or more such locations. The edge cache uses the identifier to ensure that the appropriate service variant is provided to the requesting device 106.

During playback of the requested primary content according to the playlist or manifest thereof, the client may reach a trigger (such as a URL redirect trigger which is placed in a manifest at each instance of an SCTE-35 marker by the packager 212), indicating that content may no longer be provided, and/or alternate content is needed. The trigger event in one exemplary implementation causes the CPE 106 to request an appropriate URL from the Manifest Manipulator (MM) 204, another computerized network entity (which may be a software application or process operating on a host server 205 or other hardware environment; e.g., co-located with other network functionality). The MM 204 then queries the ADS 202 for information regarding which individual ones of the plurality of secondary content should be inserted into the content. In one implementation, the ADS 202 consults a list of pre-designated alternative content provided by the content providers 201 to determine which URL (i.e., the URL for which content) should be transmitted to the requesting device 106.

The ADS 202 responds to the MM 204 with a decision which gets translated into a list of URL's that represent the "chunks" of the secondary content that collectively comprise secondary content element (e.g., an entire advertisement). In an exemplary embodiment of the present disclosure, the ADS response also contains one or more unique identifiers (such as, e.g., a session-specific identifier such as a globally unique identifier (GUID) or universally unique identifier (UUID) that uniquely represent the client's request for a session (e.g., a video session)), or yet other types of identifying information. The list of secondary content-related URLs is then inserted into the manifest or playlist that contains the list of addresses or URLs for the associated primary content, whether in addition to, or in substitution of, the primary content URLs. The purpose of implementing the unique identifiers is so that the client is required to request at least one of the actual secondary content "chunks" using the included identifier, in order for an accounting request to be considered legitimate.

The client 106 parses the manifest and requests from the ADS 202 the first URL for each unique secondary content request (referred to herein as an "accounting" URL), which also contains the unique identifier for the session. The ADS 202 verifies that the unique identifier is the actual unique identifier that the ADS 202 had (recently) generated. Upon a successful validation, the ADS 202 considers the client's 106 request based at least in part on the verification of the accounting URL to be legitimate.

It will be appreciated that various implementations described herein may also dictate varying client device configuration (e.g., in terms of application or other software or middleware) in order to accommodate the fraud prevention and/or consumption management functions described herein. For instance, certain embodiments of the CPE 106 of FIG. 2 may be IP-enabled client devices (whether fixed or mobile in form), that may include an MSO or third party "app" thereon for interface with the MSO's IP-packetized content delivery service. The app may, for example, include the necessary code to examine and extract the aforementioned GUID and/or beacons from the received manifest file, and utilize them in forming requests to the ADS or CDN for content delivery, or for informational purposes to the ADS (e.g., messages indicate of beacons for percent completion).

In other implementations, the client 106 may comprise a DSTB (digital settop box) or the like, with middleware which can be "flashed" or updated in order to implement the GUID and/or beacon functionality. Myriad other configurations of CPE 106 useful with the present disclosure will be recognized by those of ordinary skill.

Methods—

Figure 3:
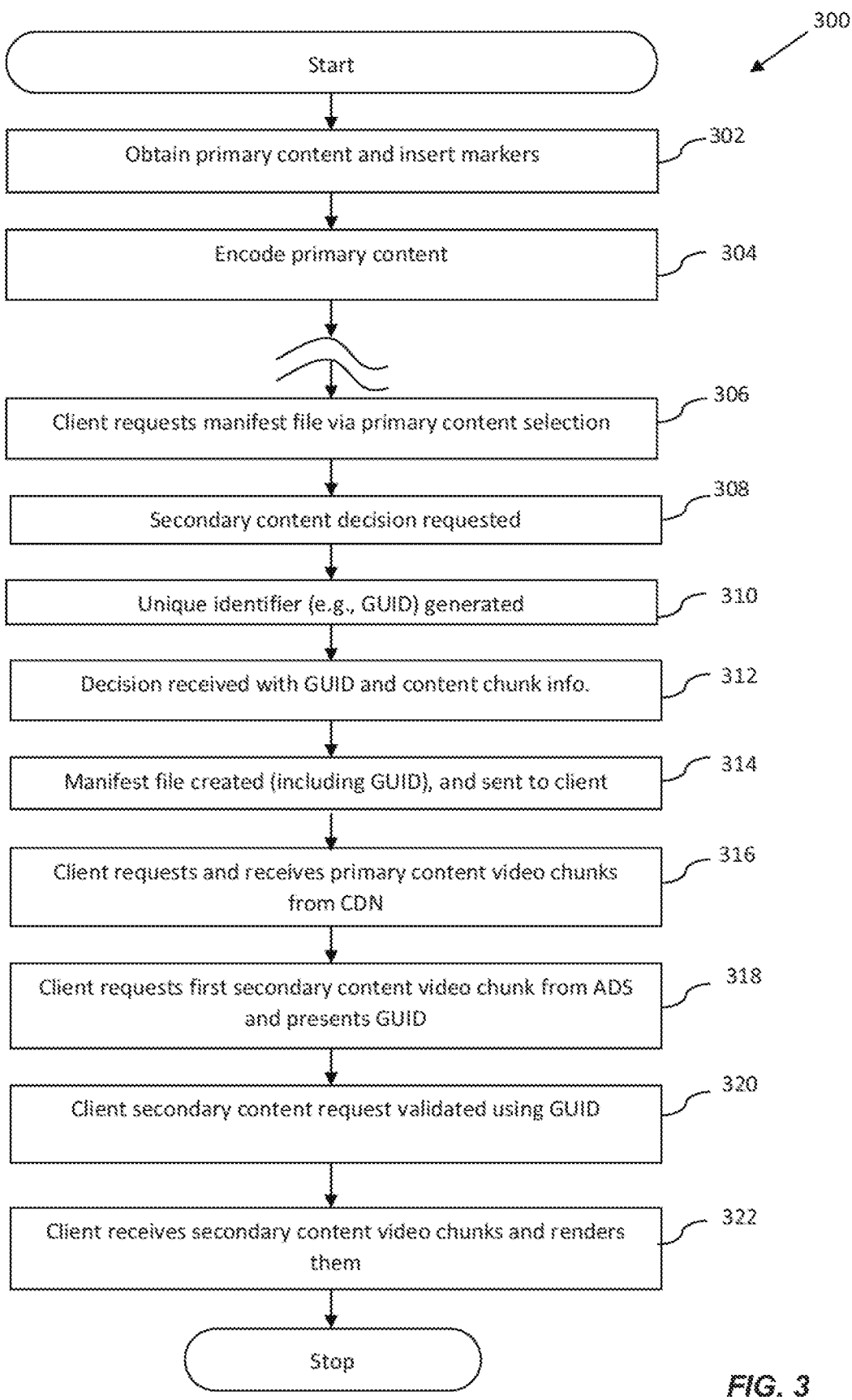
FIG. 3 is a logical flow diagram illustrating one embodiment of a method for preventing secondary content (e.g., advertisement) fraud in a content distribution network.

Referring now to FIG. 3, an exemplary embodiment of a method 300 for preventing advertisement viewing fraud within a managed network, such as the exemplary network of FIGS. 1-1e, is illustrated.

As shown, per step 302, one or more primary content elements are obtained. For instance, a number of different programs may be ingested into the network 200 from third party content sources. In one particular implementation of step 302 of the method 300, a content provider 201 creates a cross-reference list of identifiers (such as e.g., headend IDs, geographic or location identifiers, system identifier, market identifier, program ID, stream ID) to appropriate services based on negotiated viewing rights. In one embodiment, each available service may be associated to e.g., a relevant geographic region, and/or according to other criteria.

The content provider 201 publishes the matchup of headend ID (or other ID as indicated above) to particular programming for use by the AMS 203. A new list is generated, in one embodiment, based on particular events (such as a user request), or periodically, or whenever an event notification is needed. The AMS 203 may also request or "pull" the list from the content provider(s). The list is published to the AMS 203 in one embodiment using a WebServices interface, although other approaches may be used consistent with the present disclosure.

The content is marked with one or more markers or triggers. In one embodiment, the markers comprise SCTE-35 markers as discussed above, and indicate alternate program events. In one such implementation, the content provider 201 is responsible for marking events. Alternatively, the content provider 201 may merely provide necessary information to the AMS 203, ADS 202, packager 212, or the origin server 214, and one of these entities may insert appropriate markers or triggers into the relevant events. As yet another alternative, the marker insertion task may be divided between the content providers and one or more other entities, such as based on a prescribed division scheme (e.g., content providers insert certain types of markers, while other entities insert others).

The content is then encoded and published per step 304. In one embodiment, the content is encoded into an ABR (adaptive bit rate) streaming protocol based on a hypertext transfer protocol (HTTP) transport for provision to mobile devices using e.g., HLS or Smooth Streaming, or ISO-DASH, as discussed above. As the content is encoded, the SCTE-35 or otherwise marked alternate program event is converted by the packager 212 to a redirection URL in the manifest or playlist for the content which is ultimately published and stored on the origin server 214 or edge cache 216. Normally, the client device 106 plays the content from the manifest, and when the redirect URL is encountered, it points the client to the MM 204, which acts as a proxy server for the ADS 202. However, in the exemplary embodiment of the present disclosure, the redirect URL resolves to the ADS 202 which, as described elsewhere herewin, validates the client's request.

At step 306, the client requests the manifest for the primary content from the MM 204. For example, one of the previously ingested and encoded/marked programs is requested by the client via e.g., an application program (e.g., guide, web browser, etc.) running thereon, which triggers a request for the manifest file.

At step 308, the MM 204 queries the ADS 202 for information regarding which individual ones of the plurality of secondary content should be inserted into the content. The ADS 202 consults a list of pre-designated alternative content provided by the content providers 201 (or otherwise, such as being based on one or more local advertising campaigns from e.g., an content distributor (MVPD)) to determine which URL (i.e., the URL for which content) should be transmitted to the requesting device 106. In one embodiment, the MM 204 queries the ADS 202 by sending a message.

In one exemplary configuration, the ADS 202 also generates one or more unique identifiers embedded in the data or metadata of the secondary content or associated with the secondary content streamed or transmitted from the head end of the network, such as by the MSO, or by a third party server or service (step 310). The one or more identifiers are again, in one exemplary embodiment, utilized to determine whether an accounting request is to be considered legitimate, by requiring that the client requesting the manifest or playlist present an authentic or valid unique identifier, as discussed elsewhere herein.

In one embodiment, the one or more unique identifiers are "per-session" unique identifier that uniquely represents the client's request for a session (e.g., a video session). In one implementation, the one or more unique identifiers comprise a globally unique identifier (GUID) and/or universally unique identifier (UUID)), although it will be appreciated that other approaches may be used. For instance, in one alternate implementation, the unique identifier may comprise a seed value to be used by a shared one-way hash algorithm possessed by the client and the ADS or MM. As is well known, one-way hashing functions are cryptographic elements which, when a given value (seed) is inserted, produce a wholly unique output value. The algorithm is undiscoverable by the output alone, and hence surreptitious attempts to "hack" the algorithm using the output values are frustrated. The sharing entities (here, client and ADS/MM) should produce an identical output when the seed (input) is identical, and hence this can be used to authenticate the request, such as where the manifest file contains a unique seed (which may be issued on a per-session basis, rotated periodically, or expire, and itself comprise an output of another cryptographic process) which the client operates on using the hash algorithm to generate an output, and returns that output (i.e., in place of or along with the aforementioned GUID) as part of the secondary content request to the ADS.

In another implementation, the selection of URLs or other addressing may be used to indicate authenticity of the secondary content request. For instance, the secondary content URLs disposed within each manifest file (even for the same secondary content asset) may be changed or rotated periodically or per-session, so that each manifest is unique in one or both of (i) one or more URLS used for content delivery, and/or (ii) the order of which the URLs are presented to the ADS. Hence, in one variant, the ADS is configured to select the URLs associated with the chunks of the secondary content element(s) to be served with the manifest file in such a fashion as to be unique in some capacity (there by address, order, both, or some other metric), and later verify this same uniqueness is preserved on any subsequent "client" requests for the request to be considered valid. This approach advantageously allows use of a client which requires no special adaptation of its software/firmware (e.g., to extract and include a GUID or similar in its requests); rather, the client merely extracts the URLs as it normally would and includes them in its request, and it is the URLs themselves (or their order) which act as the "unique identifier".

Similarly, the GUID or unique identifier can be appended to or embedded within the URL itself, such that "static" URLs can be used for a given secondary element, but validation of the request via the GUID or other identifier can still occur by the ADS.

The list of secondary content-related URLs is then inserted or embedded into the manifest or playlist that contains the list of URLs for the associated primary content. The first URL for each unique secondary content request is an "accounting" URL which also contains the unique identifier for the session.

It is appreciated, however, that other identifiers may be employed, the foregoing being merely illustrative of the overall concept of linking the individual ones of the secondary content being requested to the user/device requesting access to the secondary content and associated primary content. For example, the present disclosure also contemplates using other mechanisms such as those employed in the registration process for authenticating user and/or requesting device identity, discussed in previously referenced co-owned and co-pending U.S. patent application Ser. No. 13/403,802 filed Feb. 23, 2012 and entitled "APPARATUS AND METHODS FOR PROVIDING CONTENT TO AN IP-ENABLED DEVICE IN A CONTENT DISTRIBUTION NETWORK". Such mechanisms for authenticating user and/or requesting device identity described therein, include e.g., digital certificates, key exchanges, biometric data relating to a user, and so forth.

In one embodiment, the ADS 202 maintains a list of all identifiers that it has generated for secondary content decision requests made for all active sessions.

At step 312, the ADS 204 publishes one or more URLs for the appropriate content that will replace the requested content at the marked event. In other words, the ADS 202 responds to the MM 204 with a decision which gets translated into a list of URL's that comprise the individual ones of secondary content. The ADS 202 may obtain the correct redirect URL from the content providers 201 or, alternatively, the packager 212 or MM 204 may provide the URL's of the primary and secondary content to the ADS 204. As another option or alternative, a local ad campaign (or content distributor (MVPD) may act as the source. The ADS 202 uses the URLs to create the associated service list with the appropriate URLs. In this instance, when the client device 106 encounters the event, and requests a redirect URL the ADS 202 may consult the service list to redirect the device to the appropriate content. The individual ones of secondary content may also optionally contain one or more beacons or tags inserted therein, as discussed infra.

At step 314, the MM 204 inserts the URLs for individual ones of secondary content determined by the ADS 202 into the manifest associated with the insertion points indicated by the triggers contained in the primary content. The MM 204 then provides the manifest to the client 106.

At step 316, the client 106 then parses the manifest, and the device 106 attempts to access content from the network (e.g., CDN) by sending a request for the primary content. The client 106 uses each URL listed in the manifest to request data from the service provider. For URLs that represent the primary content, the requests are typically made to a CDN which returns "chunks" of content to be rendered by the client device.

Per step 318, when an secondary content break occurs, the first secondary content-related URL resolves to the ADS 202, wherein the one or more unique identifiers provided to the client 106 in step 314 are presented (whether as part of the requested URL of the first chunk, as part of each URL of each chunk, as part of a separate message sent to the ADS, or yet other approach.

In one embodiment, the manifest manipulation-based secondary content insertion appears seamless to the end user by configuring the primary content "chunks" and the secondary content "chunks" to align the secondary content break boundaries with the primary content "chunk" boundaries.

At step 320, the verification process is performed. When the ADS 202 receives this request, the ADS 202 verifies that the one or more unique identifiers provided in the request is corresponding one or more unique identifiers that it had recently generated in step 310 (or via other uniqueness attributes as described previously herein). If the one or more unique identifiers is/are determined to be the recently generated one or more unique identifiers, then the ADS 202 performs an accounting function to note that an individual one of the secondary content is about to be delivered (and presumably viewed by the client 106). In other words, upon a successful validation, the ADS 202 considers the client's 106 request based at least in part on the verification of the accounting URL to be legitimate and thus, counts is to be utilized by the content distributor in billing the advertiser. It is noted that in this particular embodiment, no actual consumption or rendering is verified; rather, the presentation of the correct GUID or other data validates the request. Moreover, the exemplary approach of FIG. 3 also does not validate the primary content request via the GUID; rather, the only predicate for delivery of the secondary content chunk(s) is the validation of the secondary content request by the ADS.

Per step 322, the client 106 then requests the other ones of the individual ones of the secondary content from the CDN 214 based upon the remaining secondary content related URLs listed in the manifest file, and receives and renders. Note that in one variant, the validation of step 320 need only occur for the first chunk; all remaining URLs associated with eth secondary content in the manifest file resolve to the CDN (or another non-ADS entity); these are presumed to be valid requests (e.g., if received within a prescribed period of time). Alternatively, in another variant, each secondary content URL may resolve to the ADS, such that validation of each chunk request occurs before the relevant secondary content chunk is delivered. Various combinations of the foregoing may also be utilized, as will be appreciated by the artisan of ordinary skill given the present disclosure.

For each quartile received by the client 106, an accounting message is sent to the ADS 202, allowing the ADS 202 to report on the percentage of the individual one of the secondary content rendered (step 320).

Figure 3A:
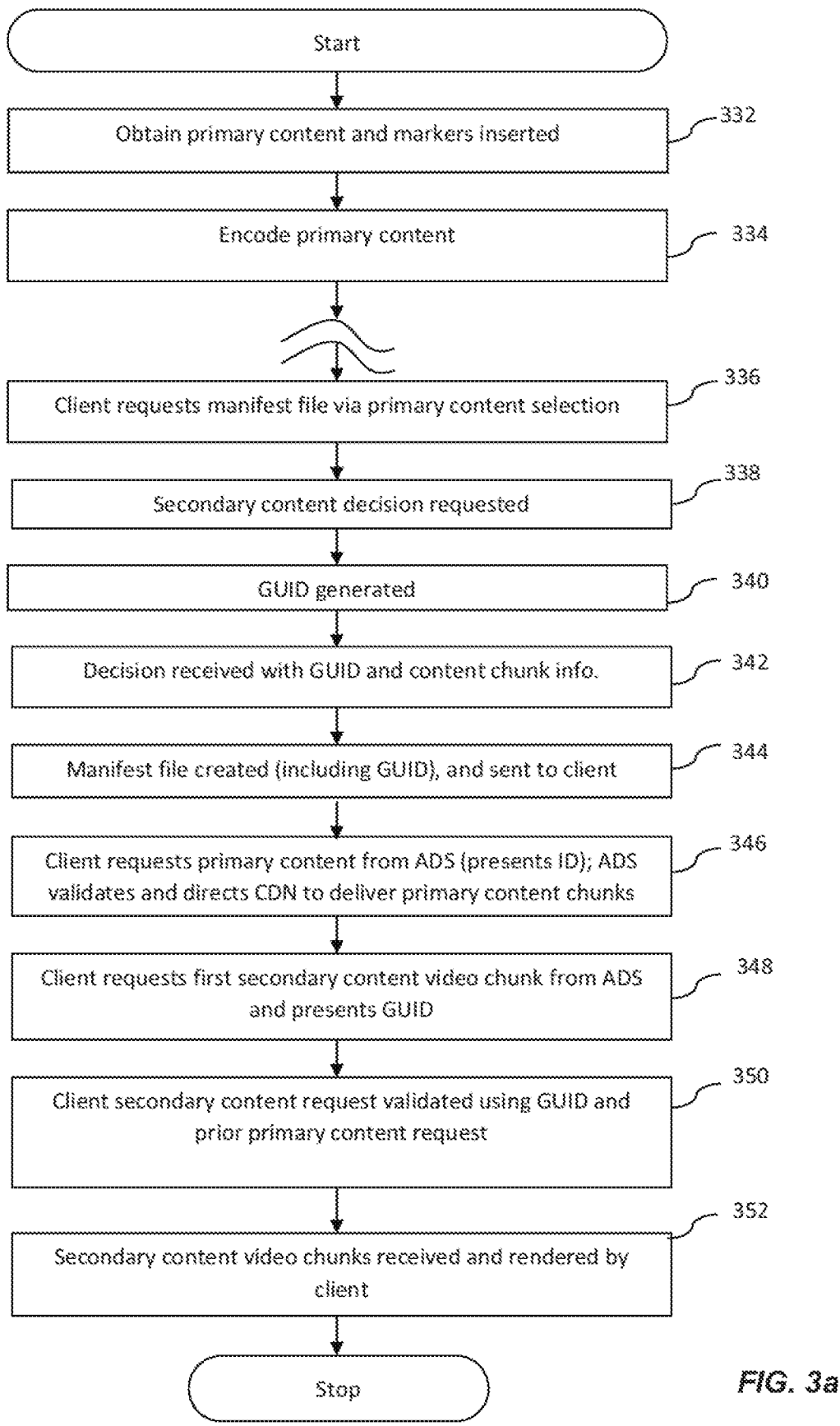
FIG. 3a is a logical flow diagram illustrating another embodiment of a method for preventing secondary content (e.g., advertisement) fraud in a content distribution network.

FIG. 3a illustrates an alternate embodiment of the foregoing method.

Specifically, at step 332, the primary content is ingested, and markers for secondary content redirect are inserted as previously described. Next, at step 334, the primary content is encoded, and listed as available.

At step 336, the client requests the manifest file (e.g., via selection of the primary content).

At step 338, a secondary content decision is requested from the ADS 202 by the MM 204. At step 340, the GUID or other identifier is generated, and provided to the MM along with the secondary content insertion decision per step 342.

At step 344, the manifest file is created (including GUID) and sent to the requesting client.

At step 346, the client requests the primary content (which in this case resolves to the ADS for request validation per the GUID inserted therein), or is otherwise validated.

Per step 348, the first request for the secondary content is received at the ADS, and the request is validated based on (i) proper presentation of the GUID or other unique identifier, and (ii) the prior validation of the primary content request from the same client (such as via GUID associated with the primary request per step 346) per step 350. In this fashion, both the presentation of the valid GUID and the prior validated content request are used as indicia of the authenticity of the secondary content request (i.e., the same client is actually consuming the primary content as well as requesting the secondary content).

Finally, the secondary content is delivered to, and rendered by the client 106 (step 352).

Secondary Content Tag or Beacon Insertion—

Figure 4:
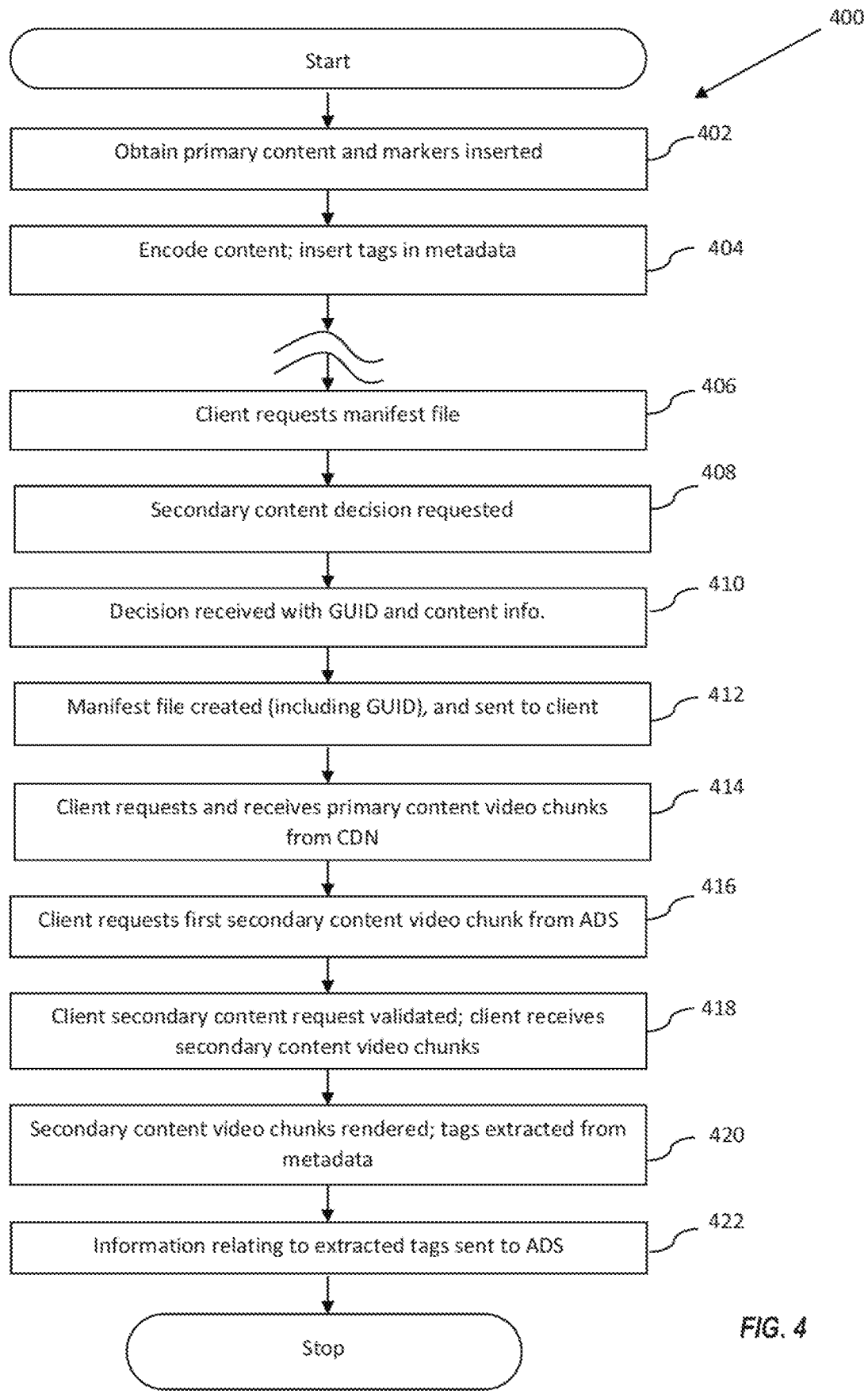
FIG. 4 is a logical flow diagram illustrating one embodiment of a method for managing secondary content consumption in a content distribution network.

Referring now to FIG. 4, a further aspect of the disclosure is described, wherein so-called "beacons", tags, or other indicators are inserted into the secondary content (or associated metadata or URLs) indicate of one or more parameters relating to e.g., the consumption of the secondary content asset by the client device.

At step 402 of the method 400, the primary content is ingested, and markers for secondary content redirect are inserted as previously described.

At step 404, the primary content is encoded, and listed as available.

At step 406, the client requests the manifest file (e.g., via selection of the primary content).

At step 408, a secondary content decision is requested from the ADS 202 by the MM 204. At step 410, the GUID or other identifier is generated, and provided to the MM along with the secondary content insertion decision.

At step 412, the manifest file is created (including GUID) and sent to the requesting client. Also part of step 412 is the "insertion" of one or more beacons or tags into the secondary content. In one exemplary implementation, the insertion of the beacons or tags involves inserting these elements into the metadata associated with the secondary content element (the latter which comprises a series of temporally contiguous chunks of media data).

As a brief aside, "metadata" includes extra data not typically found in (or at least not visible to the users of) the network. This metadata may be validated against relevant specifications if desired, such as e.g., those provided by CableLabs. For each individual secondary content element, a metadata file is generated that specifies which events are associated with that individual secondary content element. For example, a simple "one-association" secondary content element would include metadata that associates the individual secondary content element chunk with a URL where that chunk can be found. The metadata can be rendered in human-readable form if desired. Additional and/or different metadata content may be used, such as, for example, providing user rating data for particular events, source of the content element, etc. The metadata information can be packaged in a prescribed format such as a markup language (e.g., XML, or JSON). International standards for audiovisual metadata, such as the ISO/IEC "Multimedia Content Description Interface" (also referred to as MPEG7), or the TV-Anytime Forum's "Specification Series: S-3 on Metadata", could also be used as the basis for the metadata.

The metadata is in the exemplary implementation delivered with the manifest file issued by the MM, although other approaches may be used consistent with the disclosure. As described previously, one particular implementation of the foregoing approach uses temporally-related (e.g., quartile or percentage completion) beacons, indicating e.g., 25%, 50%, and 75% and 100% of the individual one of the secondary content has been "consumed" by the client device that is rendering the content.

In one implementation of the method 400, the one or more beacons may comprise ID3 tags (for HLS), or DASH metadata/events. The embedding functions may be performed by, in one embodiment, the encoder/transcoder 210 (FIG. 2), although depending on the scheme used, such "embedding" may be performed by other entities (such as where the tag or indicator is part of e.g., a URL or other data element other than the encoded content).

As noted, the term "consumed" as used in the present context may have various definitions, including without limitation: (i) receipt of a valid consumption request at the AMS; (ii) receipt of a data indicative of an actual decode of the relevant chunk(s), or (iii) receipt of data indicative of extraction of the beacon/indicator from e.g., the metadata of a received content chunk (without knowledge of actual decode by the client). Hence, the present disclosure contemplates variants of the foregoing process wherein the beacon or tag data is embedded in or associated with various different elements delivered to the client. For instance, as noted above, the beacons may be embedded in or be part of the metadata which is associated with the manifest file.

Figure 4A:
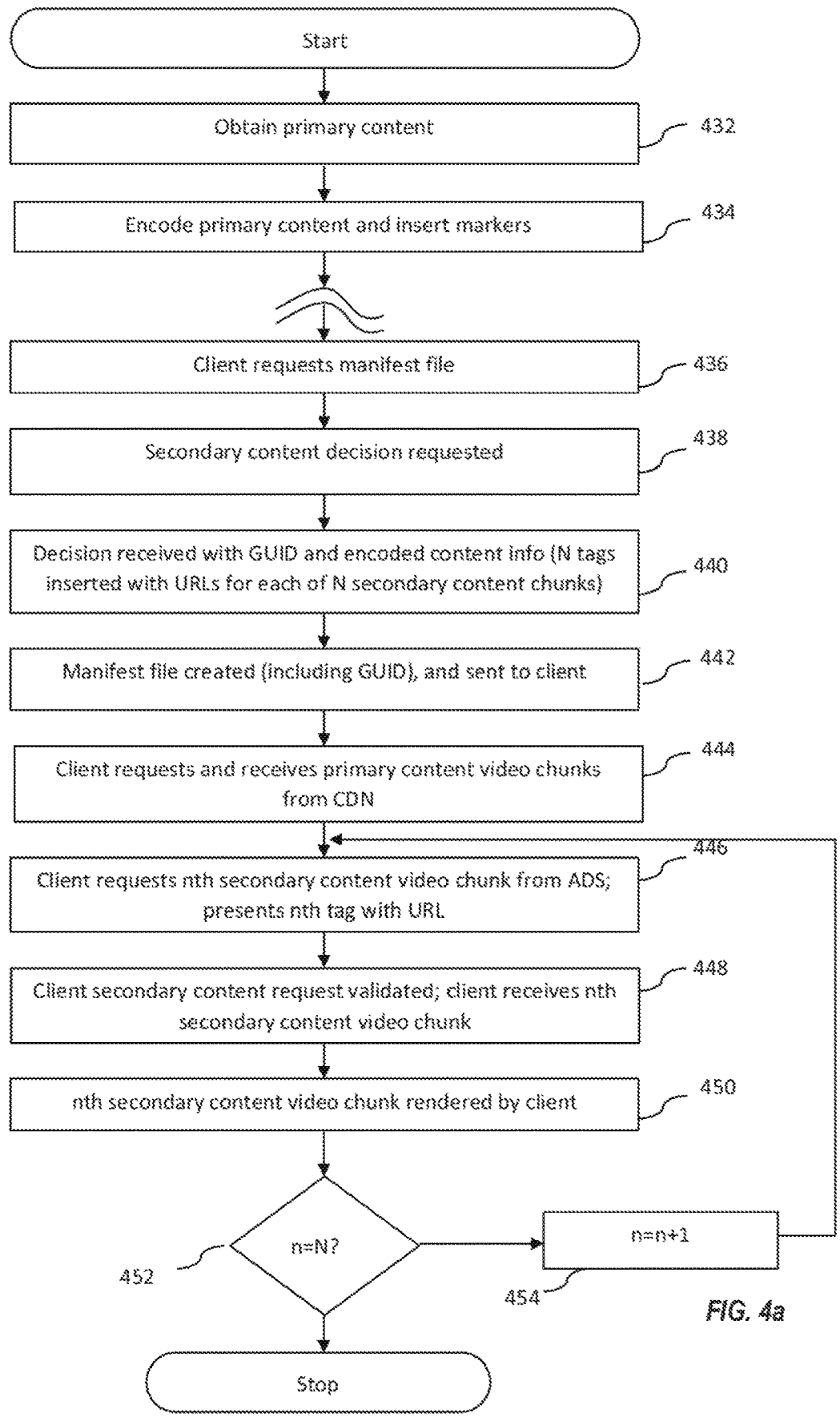
FIG. 4a is a logical flow diagram illustrating another embodiment of a method for managing secondary content consumption in a content distribution network.
Figure 4B:
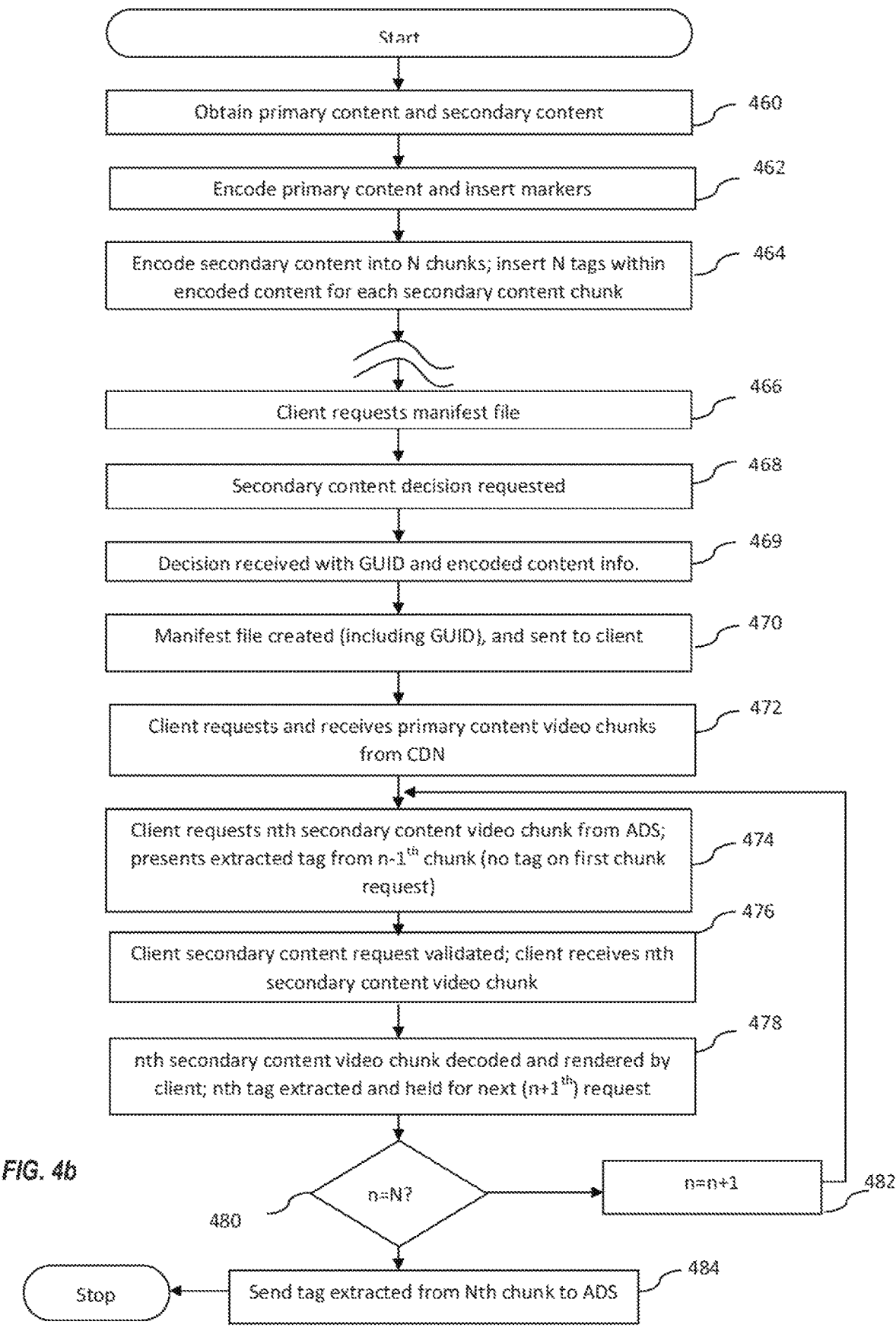
FIG. 4b is a logical flow diagram illustrating yet another embodiment of a method for managing secondary content consumption in a content distribution network.
Figure 5:
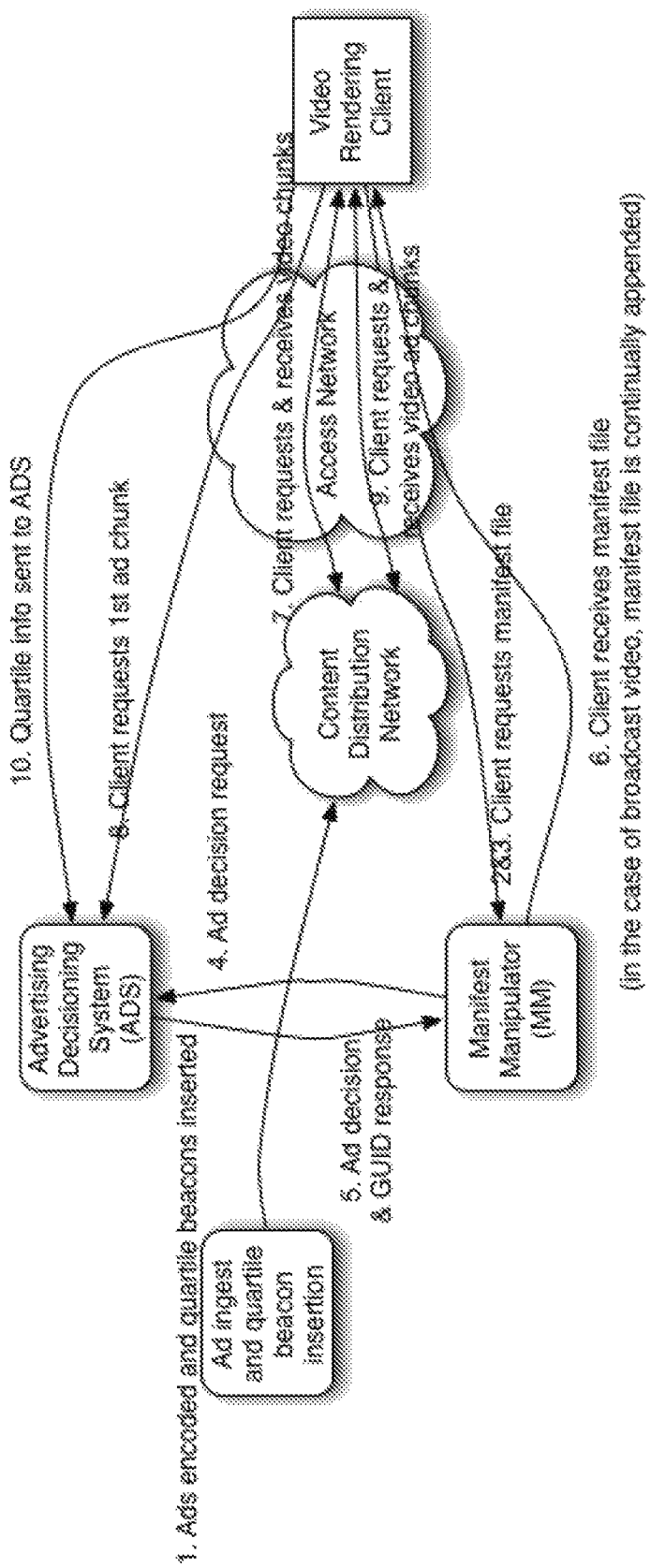
FIG. 5 is a logical process diagram illustrating an exemplary implementation of the operation of the architecture of FIG. 2, including both advertising fraud prevention and advertising consumption management functions thereof.

In another implementation, the beacons or tags are embedded in or part of one or more of the URLs associated with the secondary content chunks. In yet another implementation, the beacons or tags are embedded within the encoded content itself (e.g., as part of or after the last GOP, etc. in the encoded MPEG-4 or H.264 content files). In this fashion, a given content chunk must actually be decoded (and presumably rendered) by the client device in order for the beacon or tag to be extracted. See discussions of FIGS. 4a and 4b provided subsequently herein.

At step 414, the client requests the primary content (which in this case resolves to the CDN).

Per step 416, the first request for the secondary content is received at the ADS, the request is validated based on proper presentation of the GUID or other unique identifier, and the requested content chunk(s) then delivered to the client (step 418).

At step 420, the received secondary content chunks are rendered by the client, and the beacons or tags extracted from the metadata (or the content elements themselves, as noted above). Each extracted tag (or information derived therefrom) is then sent to the ADS per step 422. It will be appreciated that various orders of performance of the foregoing steps are contemplated by the present disclosure, such as where e.g., (i) the extracted tags or beacons are sent to the ADS prior to rendering of the encoded content chunk; (ii) the extracted tags or beacons are sent to the ADS during rendering of the encoded content chunk; and (iii) the extracted tags or beacons are sent to the ADS after completion of rendering of the encoded content chunk, such as by way of the subsequent chunk request to the source URL, or as a separate communication. The individual tags/beacons may also be aggregated and sent to the ADS or other responsible network entity as a file or similar, such as via an 00B message protocol.

FIG. 4a shows an alternate methodology to that 400 of FIG. 4. Specifically, at step 432, the primary content is ingested, and markers for secondary content redirect are inserted as previously described. Next, at step 434, the primary content is encoded, and listed as available.

At step 436, the client requests the manifest file (e.g., via selection of the primary content).

At step 438, a secondary content decision is requested from the ADS by the MM. At step 440, the GUID or other identifier is generated, and provided to the MM along with the secondary content insertion decision. Also part of step 440 is the "insertion" of one or more beacons or tags into the URLs associated with the secondary content. In the exemplary implementation of FIG. 4a, the insertion of the beacons or tags involves inserting these elements into or associating them with individual ones of the URLs for the secondary content. For instance, where a secondary content element is divided temporally into N chunks, tags or beacons with data corresponding to 1/N, 2/N, . . . N/N completion may be utilized. Hence, a first tag may be indicative of 1/N completion; i.e., that the first of the N chunks has been at least requested. Other partitioning or indication schemes may be used as well, such as those relating to other consumption-related parameters of interest (e.g., chunks within which a "pause" or termination event was received, a single end-to-end or "full play" of the advertisement, interactivity by the user with a telescoping or other function indicative of possible interest, etc.).

At step 442, the manifest file is created (including GUID) and sent to the requesting client.

At step 444, the client requests the primary content (which in this case resolves to the CDN).

Per step 446, the first request for the secondary content is received at the ADS, the request is validated based on proper presentation of the GUID or other unique identifier, and the requested content chunk(s) then delivered to the client (step 448). Also received at step 446 by the ADS is the nth chunk tag or beacon, which is embedded within or otherwise associated with the requested chunk's URL.

At step 450, the received secondary content chunk is rendered by the client. At or before completion of the nth chunk rendering by the client, the client accesses the manifest for the next URL (including the nth beacon or tag associated therewith), and transmits it to the serving entity (e.g., CDN). In such case, the CDN may pass the received tag to the ADS, or the client may be configured to route the tag portion to the ADS, while routing the URL to the CDN.

Per steps 452 and 454, the foregoing process iterates until all N of the secondary content chunks have been delivered to the client.

FIG. 4b shows yet another alternate methodology to that 400 of FIG. 4. Specifically, at step 460, the primary content is ingested, and markers for secondary content redirect are inserted as previously described. The secondary content is also obtained or identified per step 460.

At step 462, the primary content is encoded, and listed as available.

At step 464, the secondary content is encoded into N separate chunks, and the beacons or tags for each chunk inserted as part of the encoding process (i.e., within the content of each chunk), such that the content chunk has to be decoded to extract the beacon/tag.

At step 466, the client requests the manifest file (e.g., via selection of the primary content).

At step 468, a secondary content decision is requested from the ADS by the MM. At step 469, the GUID or other identifier is generated, and provided to the MM along with the secondary content insertion decision (and associated secondary content asset information).

At step 470, the manifest file is created (including GUID) and sent to the requesting client.

At step 472, the client requests the primary content (which in this case resolves to the CDN).

Per step 474, the first request for the secondary content is received at the ADS, the request is validated based on proper presentation of the GUID or other unique identifier, and the requested content chunk(s) then delivered to the client (step 476).

At step 478, the received secondary content chunk is decoded and rendered by the client. As part of the decode, the nth tag or beacon is extracted from the content element, such as after rendering of the element has completed.

At step 480, it is determined whether the all N chunks have delivered to the client; if not, the method proceeds to step 482, wherein the count (n) is incremented, and the extracted nth tag or beacon is provided to the ADS along with presentation of the URL for the n+1 chunk to e.g., the CDN.

When all N chunks have been delivered (or rendering of N−1 chunks have been confirmed by receipt of the N−1th tag) per step 480, the final (Nth) content element is rendered, the Nth tag extracted, and the Nth tag sent to the ADS per step 484.

It will be recognized that while certain aspects of the disclosure are described in terms of a specific sequence of steps of a method, these descriptions are only illustrative of the broader methods described herein, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the embodiments disclosed and claimed herein.

While the above detailed description has shown, described, and pointed out novel features of the disclosed embodiments as applied to various systems, it will be understood that various omissions, substitutions, and changes in the form and details of the device or process illustrated may be made by those skilled in the art without departing from the principles described herein. The foregoing description is of the best mode presently contemplated. This description is in no way meant to be limiting, but rather should be taken as illustrative of the general principles of the disclosure. The scope of the disclosure should be determined with reference to the claims.

What is claimed is:

1. A method for validating a communication received in a content distribution network, the method comprising:

receiving, at a content management entity of the content distribution network, a first communication from an Internet Protocol (IP)-enabled client device for delivery of IP packetized media content within the content distribution network;

causing generation of a data element relating to the first communication;

transmitting a data structure comprising the data element, the data element having a prescribed temporal period of validity;

receiving, at the content management entity of the content distribution network, a second communication, the second communication comprising at least the data element or a derivative thereof;

utilizing the data element or the derivative thereof to validate the second communication, the utilizing of the data element or the derivative thereof to validate the second communication comprising determining that the second communication was received by the content management entity within the prescribed temporal period of validity; and transmitting data associated with the second communication to a computerized accounting process, the data associated with the second communication enabling the computerized accounting process to count the second communication as a valid communication;

wherein the data element comprises an at least periodically unique identifier useful only within the content distribution network for the prescribed temporal period of validity.

2. The method of claim 1, wherein:

the second communication comprises data representative of request for secondary content; and the utilizing of the data element or the derivative thereof to validate the second communication prevents a video advertising accounting system from counting the request for the secondary content unless the secondary content is requested by a valid subscriber device subscribed to the content distribution network.

3. The method of claim 1, wherein the second communication comprises a request for a first secondary content element; and the method further comprises receiving a third communication from the IP-enabled client device, the third communication comprising: (i) at least information, the information relating to a second secondary content element; (ii) the data element or the derivative thereof; and (iii) a consumption-related value, the consumption-related value is indicative of at least one of a quality or amount of a then-current consumption of the second secondary content element by the IP-enabled client device.

4. The method of claim 3, wherein the consumption-related value comprises a value related to beacon data embedded in a data stream comprising the second secondary content element, the beacon data comprises beacon data indicating at least a percentage of the first secondary content element consumed by the IP-enabled client device.

5. The method of claim 1, wherein:

the data element comprises a cryptographic hash of a value; and the utilizing of the data element or the derivative thereof to validate the second communication comprises: (i) obtaining a copy of the value from a storage apparatus within the content distribution network; (ii) utilizing a cryptographic hash algorithm common to both the content management entity and the IP-enabled client device, to hash the obtained copy of the value to generate a hash; and (iii) comparing the hash to the cryptographic hash to identify any differences therebetween.

6. Computer readable apparatus comprising a non-transitory storage medium, the non-transitory storage medium comprising at least one computer program having a plurality of instructions, the plurality of instructions configured to, when executed on a processing apparatus, cause a computerized network apparatus to:

receive a communication from an Internet Protocol (IP)-enabled client device, the communication relating to delivery of IP packetized media content to the IP-enabled client device;

cause generation of a unique session identifier relating to the communication;

transmit a data structure comprising the unique session identifier, the unique session identifier comprising a data value having a prescribed temporal period of validity;

receive a second communication from the IP-enabled client device, the second communication comprising data representative of request for secondary content and a cryptographic hash of the data value;

utilize the cryptographic hash of the data value to validate the second communication, the utilization of the cryptographic hash of the data value to validate the second communication comprising a determination that the second communication was received by the computerized network apparatus within the prescribed temporal period of validity;

based on the validation, cause the delivery of the secondary content to the IP-enabled client device via an IP transport; and transmit data associated with validation of the second communication to a computerized accounting process, the data associated with the validation of the second communication enabling the computerized accounting process to count the second communication as a valid communication.

7. The computer readable apparatus of claim 6, wherein the plurality of instructions are further configured to, when executed on the processing apparatus, cause the computerized network apparatus to:

receive a third communication, the third communication comprising data representative of a request for second secondary content and a second unique session identifier provided in the transmitted data structure, the second unique session identifier comprising a second data value;

utilized the second data value to validate the third communication; and cause provision of the second secondary content to the IP-enabled client device via the IP transport;

wherein the unique session identifier and the second unique session identifier each comprise unique identification values different from each other.

8. The computer readable apparatus of claim 7, wherein the third communication further comprises a consumption-related value indicative of at least one of a quality or an amount of a then-current consumption of the secondary content by the IP-enabled client device, the consumption-related value embedded within at least a portion of the secondary content such that the secondary content must be decoded by the IP-enabled client device in order to obtain the consumption-related value.

9. The computer readable apparatus of claim 8, wherein the consumption-related value comprises a value related to an ID3 tag embedded in the secondary content.

10. The computer readable apparatus of claim 6, wherein the utilization of the cryptographic hash of the data value to validate the second communication comprises: (i) obtainment of a copy of the data value from a storage apparatus within a content distribution network; (ii) utilizing a cryptographic hash algorithm common to both the computerized network apparatus and the IP-enabled client device, to hash the obtained copy of the data value to generate a hash; and (iii) a comparison of the hash to the cryptographic hash to identify any differences therebetween.

11. Computerized network apparatus for use in a content distribution network, said computerized network apparatus comprising:

processing apparatus;

network interface apparatus in data communication with the processing apparatus and configured to conduct data communications with a plurality of Internet Protocol (IP)-enabled client devices via at least the content distribution network; and storage apparatus in data communication with said processing apparatus, said storage apparatus comprising at least one computer program having a plurality of instructions configured to, when executed by said processing apparatus, cause the computerized network apparatus to:

receive a first communication from an Internet Protocol (IP)-enabled client device for delivery of IP packetized media content within the content distribution network;

generate a data element relating to the first communication;

transmit a data structure comprising the data element, the data element having a prescribed temporal period of validity;

receive a second communication, the second communication comprising at least the data element or a derivative thereof; and utilize the data element or the derivative thereof to validate the second communication, wherein the utilization of the data element or the derivative thereof to validate the second communication comprises a determination that the second communication was received by the computerized network apparatus within the prescribed temporal period of validity;

wherein the data element comprises an at least periodically unique identifier useful only within the content distribution network for the prescribed temporal period of validity.

12. The computerized network apparatus of claim 11, wherein the plurality of instructions are further configured to, when executed by the processing apparatus, cause the computerized network apparatus to:

transmit data associated with the second communication to a computerized accounting process, the data associated with the second communication enabling the computerized accounting process to count the second communication as a valid communication.

13. The computerized network apparatus of claim 11, wherein the plurality of instructions are further configured to, when executed by the processing apparatus, cause the computerized network apparatus to:

authenticate the IP-enabled client device as having access to the content distribution network, the authentication based at least in part on the data element or the derivative thereof.

14. The computerized network apparatus of claim 11, wherein the second communication further comprises consumption-related data.

15. The computerized network apparatus of claim 11, wherein the plurality of instructions are further configured to, when executed by the processing apparatus, cause the computerized network apparatus to:

cause insertion of at least one of a plurality of secondary content components within at least one insertion break within the IP packetized media content; and cause delivery of at least a portion of the IP packetized media content with the at least one of the plurality of secondary content components inserted therein to the IP-enabled client device.

16. The computerized network apparatus of claim 15, wherein the plurality of instructions are further configured to, when executed by said processing apparatus, cause the computerized network apparatus to:

cause the delivery of the at least portion of the IP packetized media content with the at least one of the plurality of secondary content components inserted therein by utilizing a computerized content caching entity of the content distribution network (i) within a same prescribed geographical region as the IP-enabled client device, and (ii) disposed within an edge portion of the content distribution network and not a core portion.

17. The computerized network apparatus of claim 11, wherein the communication comprises a secondary content request associated with the delivery of IP packetized media content; and wherein the plurality of instructions are further configured to, when executed by the processing apparatus, cause the computerized network apparatus to:

verify that at least a portion of the IP packetized media content has been previously requested by the IP-enabled client device as part of a common session.

18. The computerized network apparatus of claim 17, wherein the common session is identified within the data element or the derivative thereof.

19. The computerized network apparatus of claim 17, wherein the transmission of the data structure comprises a transmission of at least a host data structure comprising data indicative of one or more content distribution network storage locations where the IP packetized media content may be obtained.

20. The computerized network apparatus of claim 19, wherein the host data structure comprises a manifest file comprising at least one or more URLs corresponding to the one or more content distribution network storage locations where the IP packetized media content may be obtained.

* * * * *